(12) United States Patent
Togawa et al.

(10) Patent No.: US 8,286,161 B2
(45) Date of Patent: Oct. 9, 2012

(54) APPARATUS, METHOD, AND COMPUTER PROGRAM FOR SETTING AND UPDATING A RELATIONSHIP BETWEEN A LOGICAL PROCESSOR AND A PHYSICAL PROCESSOR

(75) Inventors: Atsushi Togawa, Tokyo (JP); Kenichi Murata, Tokyo (JP)

(73) Assignee: Sony Corporation, Tokyo (JP)

( * ) Notice: Subject to any disclaimer, the term of this patent is extended or adjusted under 35 U.S.C. 154(b) by 1590 days.

(21) Appl. No.: 11/236,720

(22) Filed: Sep. 28, 2005

(65) Prior Publication Data

US 2006/0075207 A1    Apr. 6, 2006

(30) Foreign Application Priority Data

Sep. 29, 2004   (JP) ............................. P2004-283533
Jun. 8, 2005    (JP) ............................. P2005-167911

(51) Int. Cl.
*G06F 9/455*     (2006.01)
*G06F 9/46*      (2006.01)

(52) U.S. Cl. ........................................... 718/1; 718/104
(58) Field of Classification Search .................. 718/1
See application file for complete search history.

(56) References Cited

U.S. PATENT DOCUMENTS

| 5,572,680 | A |   | 11/1996 | Ikeda et al. |
|-----------|---|---|---------|--------------|
| 5,692,193 | A | * | 11/1997 | Jagannathan et al. ........ 718/106 |
| 5,784,706 | A | * |  7/1998 | Oberlin et al. ................ 711/202 |
| 5,815,686 | A |   |  9/1998 | Earl et al. |
| 6,047,362 | A | * |  4/2000 | Zucker ........................... 711/203 |
| 6,075,938 | A | * |  6/2000 | Bugnion et al. ................ 703/27 |
| 6,199,179 | B1 |  |  3/2001 | Kauffman et al. |
| 6,226,734 | B1 |  |  5/2001 | Kleinsorge et al. |
| 6,260,068 | B1 |  |  7/2001 | Zalewski et al. |
| 6,332,180 | B1 |  | 12/2001 | Kauffman et al. |
| 6,381,682 | B2 |  |  4/2002 | Noel et al. |
| 6,477,634 | B1 | * | 11/2002 | Comment ...................... 711/207 |
| 6,510,496 | B1 | * |  1/2003 | Tarui et al. .................... 711/147 |
| 6,542,926 | B2 |  |  4/2003 | Zalewski et al. |

(Continued)

FOREIGN PATENT DOCUMENTS

EP        0 602 773 A1    6/1994

(Continued)

OTHER PUBLICATIONS

Govil, K; Teodosiu, D; Huang, Y.; Rosenblum, M.; "Cellular Disco: Resource Management Using Virtual Clusters on Shared-Memory Multiprocessors"; ACM Transactions on Computer Systems, vol. 18, No. 3, Aug. 2000, pp. 229-262.*

(Continued)

*Primary Examiner* — Emerson Puente
*Assistant Examiner* — Charles Swift
(74) *Attorney, Agent, or Firm* — Finnegan, Henderson, Farabow, Garrett & Dunner, L.L.P.

(57) ABSTRACT

An information processing apparatus includes a control operating system executing a process for allocating a plurality of logical processors to a physical processor in a time division manner, and a guest operating system for which a logical partition as an application entity of the logical processor is set. The control operating system sets and updates, as address conversion tables for determining an allocation relationship between the logical processor and the physical processor, two address conversion tables of a first conversion table that sets an allocation relationship between a logical partition address space and a physical address space and a second conversion table that sets an allocation relationship between a virtual address space in the guest operating system and the physical address space.

17 Claims, 23 Drawing Sheets

U.S. PATENT DOCUMENTS

| | | | |
|---|---|---|---|
| 6,633,916 B2 | 10/2003 | Kauffman | |
| 6,880,022 B1 * | 4/2005 | Waldspurger et al. | 710/9 |
| 6,895,491 B2 * | 5/2005 | Kjos et al. | 711/203 |
| 7,194,641 B2 * | 3/2007 | Hack | 713/300 |
| 7,222,221 B1 * | 5/2007 | Agesen et al. | 711/141 |
| 2002/0010844 A1 | 1/2002 | Noel et al. | |
| 2002/0016891 A1 | 2/2002 | Noel et al. | |
| 2002/0016892 A1 | 2/2002 | Zalewski et al. | |
| 2002/0032850 A1 | 3/2002 | Kauffman | |
| 2002/0052914 A1 | 5/2002 | Zalewski et al. | |
| 2006/0041733 A1 * | 2/2006 | Hyser | 711/203 |
| 2006/0048160 A1 * | 3/2006 | Olszewski et al. | 718/105 |
| 2007/0028244 A1 * | 2/2007 | Landis et al. | 718/108 |

FOREIGN PATENT DOCUMENTS

| | | |
|---|---|---|
| JP | 56-019153 | 2/1981 |
| JP | 06-187301 | 7/1994 |
| JP | 6-187301 | 7/1994 |
| JP | 11-316747 | 11/1999 |
| JP | 2000-132530 | 5/2000 |
| JP | 2000-215189 | 8/2000 |
| JP | 2003-345612 | 12/2003 |

OTHER PUBLICATIONS

European Search Report dated Jan. 27, 2011 for European Application No. 05785989.4, filed Sep. 26, 2005 (6 pages).

Edouard Bugnion et al., "Disco: Running Commodity Operating Systems on Scalable Multiprocessors," ACM Transactions on Computer Systems, Nov. 1997, vol. 15, No. 4, pp. 412-447 (36 pages).

Mendel Rosenblum et al., "Complete Computer System Simulation: The SimOS Approach," IEEE Parallel & Distributed Technology, Winter 1995, pp. 34-43 (10 pages).

Office Action issued May 17, 2011, in corresponding Japanese Application No. 2005-167911 (3 pages).

* cited by examiner

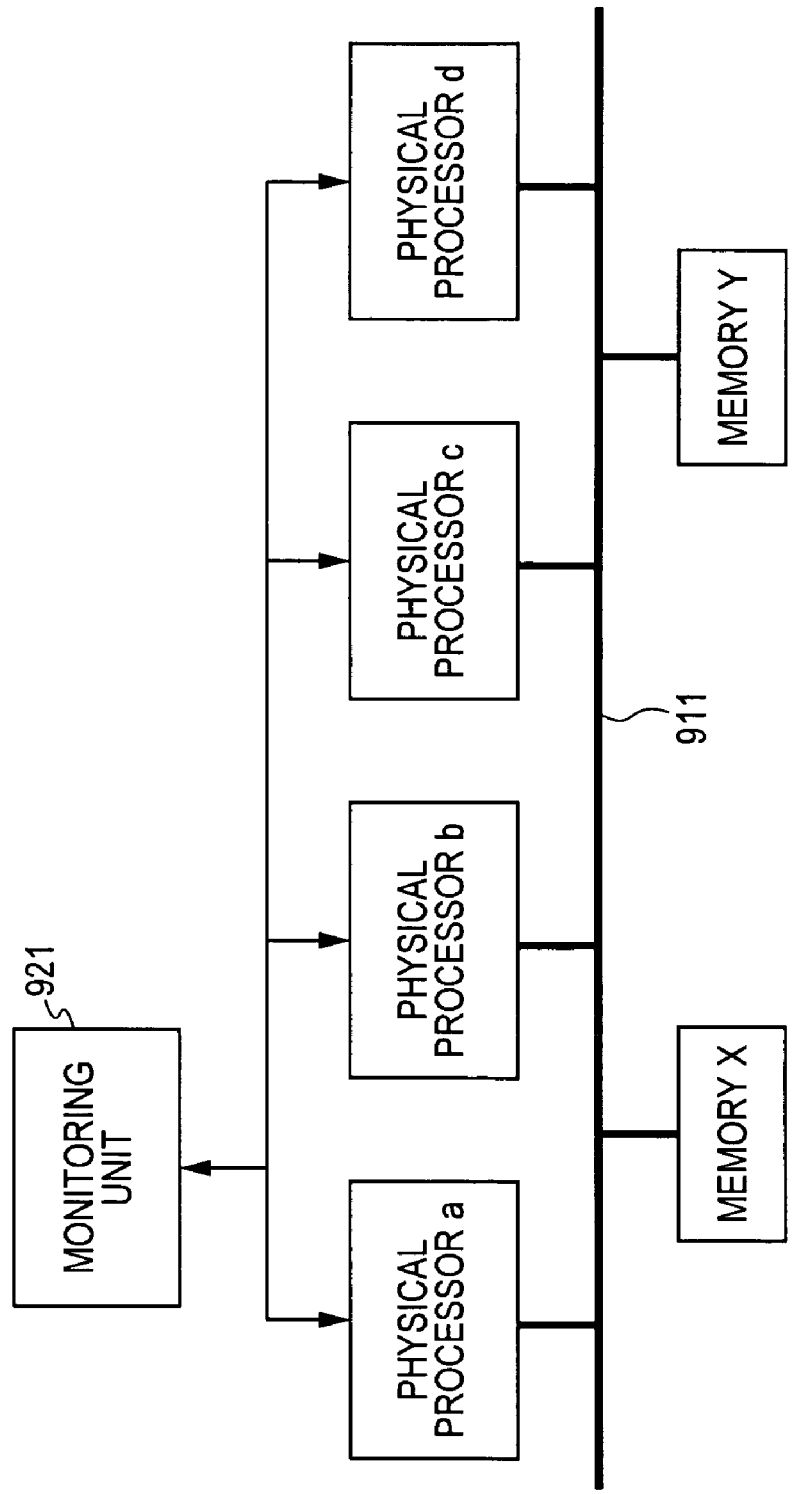

APPARATUS, METHOD, AND COMPUTER PROGRAM FOR SETTING AND UPDATING A RELATIONSHIP BETWEEN A LOGICAL PROCESSOR AND A PHYSICAL PROCESSOR

CROSS REFERENCES TO RELATED APPLICATIONS

The present invention contains subject matter related to Japanese Patent Application JP 2004-283533 filed in the Japanese Patent Office on Sep. 29, 2004, and Japanese Patent Application JP 2005-167911 filed in the Japanese Patent Office on Jun. 8, 2005, the entire contents of which are incorporated herein by reference.

BACKGROUND OF THE INVENTION

1. Field of the Invention

The present invention relates to an information processing apparatus, a process control method, and a computer program. More specifically, the present invention relates to an information processing apparatus, a process control method, and a computer program for processing data with a physical processor allocated to a logical processor in a logical partition of each operating system in a time-division manner in a multi-operating system environment where a plurality of operating systems function.

2. Description of the Related Art

In a multi operating system (OS) having a plurality of operating systems in a single system, each OS can execute respective process and hardware common to the system, such as a central processing unit (CPU) and a memory is successively switched in time sequence.

Scheduling of processes (tasks) of a plurality of operating systems is executed by a partition management software program, for example. If an OS(α) and an OS(β) coexist in a single system with the process of OS(α) being a partition A and the process of OS(β) being a partition B, the partition management software program determines the scheduling of the partition A and the partition B, and executes the process of the operating systems with the hardware resources allocated based on the determined scheduling.

Japanese Unexamined Patent Application Publication No. 2003-345612 discloses a task management technique of a multi OS system. According to the disclosure, tasks to be executed by a plurality of OS's are scheduled with a priority placed on a process having urgency.

An entity processing data is set up as a partition. More specifically, a logical partition is set up as an entity that shares resources in a system. A variety of resources such as use time of the physical processor, virtual address space, and memory space are allocated to the logical partition. The process is then performed using the allocated resources. A logical processor corresponding to any physical processor is set up in the logical partition, and data processing is performed based on the logical processor. The logical processor does not always correspond to the physical processor on a one-to-one correspondence. For example, a single logical processor can correspond to a plurality of physical processors, and a plurality of logical processors can correspond to a single physical processor.

If a plurality of processes are performed in parallel using the logical processor, the physical processor is used by scheduling the plurality of logical processors. More specifically, the plurality of logical processors uses the physical processor in a time sharing manner.

When a plurality of logical processors are used to process data with a plurality of physical processors applied, one of methods of increasing data processing efficiency is to set and update an allocation relationship between the logical processor and the physical processor. If one physical processor is used for a long period of time, the temperature of the physical processor rises as a result of heating. If a plurality of physical processors are used, the physical processors are preferably switched as appropriate.

SUMMARY OF THE INVENTION

It is desirable to provide an information processing apparatus, a process control method, and a computer program for setting and updating an appropriate allocation relationship between a logical processor and a physical processor to achieve efficient data processing and avoid using the physical processor for an excessively long period of time in a data processing system that uses a plurality of logical processors to process data with a plurality of physical processors applied.

It is also desirable to provide an information processing apparatus, a process control method, and a computer program for setting and updating an allocation relationship between the logical processor and the physical processor in an appropriate manner to efficiently process data by setting and updating appropriately a table applied to address space conversion among a virtual address space, a logical partition address (virtual physical address) space, and a physical address space.

In accordance with one embodiment of the present invention, an information processing apparatus includes a control operating system executing a process for allocating a plurality of logical processors to a physical processor in a time division manner, and a guest operating system for which a logical partition as an application entity of the logical processor is set. The control operating system sets and updates, as address conversion tables for determining an allocation relationship between the logical processor and the physical processor, two address conversion tables of a first conversion table that sets an allocation relationship between a logical partition address space and a physical address space and a second conversion table that sets an allocation relationship between a virtual address space in the guest operating system and the physical address space.

Preferably, the control operating system acquires a physical address corresponding to an index of the first conversion table determined based on a logical partition address, and updates a physical address corresponding to an index of the second conversion table determined based on a virtual address.

Preferably, in order to switch the allocation relationship between the logical processor and the physical processor, the control operating system acquires a physical address determined from an index of the first conversion table corresponding to the logical processor allocated to the physical processor, invalidates all entries in the second conversion table holding the acquired physical address, acquires an index of the first conversion table corresponding to a logical processor that is newly allocated to the physical processor, and stores, as a physical address corresponding to the acquired index, physical address information of the physical processor with the logical processor to be allocated thereto.

Preferably, the physical address includes a physical address of a memory mapped input and output register of the physical processor.

Preferably, the control operating system updates the allocation relationship between the logical processor and the physical processor to switch from one physical processor to another at the moment an operation time of a process of using the one physical processor reaches a predetermined threshold time.

Preferably, the control operating system updates the allocation relationship between the logical processor and the physical processor to switch from one physical processor to another at the moment the temperature of the one physical processor reaches a predetermined threshold temperature.

Preferably, the control operating system sets the allocation relationship between the logical processor and the physical processor so that a plurality of physical processors operating in parallel are set as a physical processor group connected to the same power supply line.

Preferably, the control operating system sets the allocation relationship between the logical processor and the physical processor, based on access status of the physical processor accessing to memories arranged in different locations within the information processing apparatus, in a manner such that an access frequency of a physical processor accessing to a memory located closer to the physical processor becomes higher.

In accordance with another embodiment of the present invention, a process control method for processing data with a plurality of logical processors allocated to a physical processor in a time division manner, includes setting a logical partition on a guest operating system as an application entity of the logical processor, and updating two address conversion tables of a first conversion table that sets an allocation relationship between a logical partition address space and a physical address space and a second conversion table that sets an allocation relationship between a virtual address space in the guest operating system and the physical address space.

In the process control method, preferably, the table updating step includes acquiring a physical address corresponding to an index of the first conversion table determined based on a logical partition address, and updating a physical address corresponding to an index of the second conversion table determined based on a virtual address.

In order to switch the allocation relationship between the logical processor and the physical processor, preferably, the process control method further include updating a physical address determined from an index of the first conversion table corresponding to the logical processor allocated to the physical processor, invalidating all entries in the second conversion table holding the acquired physical address, acquiring an index of the first conversion table corresponding to a logical processor that is newly allocated to the physical processor, and storing, as a physical address corresponding to the acquired index, physical address information of the physical processor with the logical processor to be allocated thereto.

In the process control method, preferably, the physical address includes a physical address of a memory mapped input and output register of the physical processor.

Preferably, the process control method includes updating the allocation relationship between the logical processor and the physical processor to switch from one physical processor to another at the moment an operation time of a process of using the one physical processor reaches a predetermined threshold time.

Preferably, the control operating system includes updating the allocation relationship between the logical processor and the physical processor to switch from one physical processor to another at the moment the temperature of the one physical processor reaches a predetermined threshold temperature.

Preferably, the control operating system includes setting the allocation relationship between the logical processor and the physical processor so that a plurality of physical processors operating in parallel are set as a physical processor group connected to the same power supply line.

Preferably, the control operating system includes updating setting the allocation relationship between the logical processor and the physical processor, based on access status of the physical processor accessing to memories arranged in different locations within the information processing apparatus, in a manner such that an access frequency of a physical processor accessing to a memory located closer to the physical processor becomes higher.

In accordance with yet another embodiment of the present invention, a computer program for processing data with a plurality of logical processors allocated to a physical processor in a time division manner, includes steps of setting a logical partition on a guest operating system as an application entity of the logical processor, and updating two address conversion tables of a first conversion table that sets an allocation relationship between a logical partition address space and a physical address space and a second conversion table that sets an allocation relationship between a virtual address space in the guest operating system and the physical address space.

The computer program of one embodiment of the present invention is provided, to a general-purpose computer system executing a variety of program code, in a computer-readable storage medium, such as a compact disk (CD), a floppy disk (FD), or a magneto-optic disk (MO), or a communication medium such as network. By providing the computer program in a computer readable manner, the computer system performs process responsive to the computer program.

These and other features, and advantages of the present invention will become obvious from the following description of the present invention and the accompanying drawings. In the context of the description of the present invention, the system refers to a logical set of a plurality of apparatuses, and is not limited to an apparatus that houses elements within the same casing.

In accordance with embodiments of the present invention, the logical processor is allocated to the physical processor. Tables applied to address conversion between different address spaces including the virtual address space, the logical partition address (virtual physical address), and the physical address. By appropriately modifying the conversion tables, an appropriate allocation relationship between the logical processor and the physical processor is set and updated. Efficient data processing is thus performed.

In accordance with embodiments of the present invention, the control operating system uses the two address conversion tables, namely, the first conversion table for converting the logical partition address (virtual physical address) space to the physical address space, and the second conversion table for converting the virtual address space to the physical address space. By setting and updating entries in the tables, the control operating system updates the allocation relationship between the logical processor and the physical processor. Depending on situations, the allocation relationship between the logical processor and the physical processor is modified. The physical processor thus processes data in a time sharing manner in accordance with a data process sequence. Data processing is thus appropriately performed taking into consideration workload on hardware and data processing programs.

In accordance with embodiments of the present invention, the control operating system performs a rotation process on the physical processors, namely, a migration process by updating the conversion tables. This arrangement controls heating of the physical processor due to continuous use of a long period of time.

In a system having a group of physical processors connected to different power supply lines, a plurality of logical processors allocated to different physical processors operate in parallel. By allocating the logical processors to the physical processors connected to the same power supply line, power to a physical processor group in an idle mode can be cut off. Power saving is thus performed.

In accordance with embodiments of the present invention, the address conversion table is updated to allocate the logical processor corresponding to each process to a physical processor that is located closer to a memory having a higher access frequency therefrom in a system having a plurality of memories arranged in different locations within the apparatus. The processor allocation process achieves high-speed data accessing, thereby leading to highly efficient data processing.

BRIEF DESCRIPTION OF THE DRAWINGS

FIG. 21 illustrates the allocation process of allocating the logical processor to the physical processor based on accessing to the physical processor;

DESCRIPTION OF THE PREFERRED EMBODIMENTS

Figure 1:
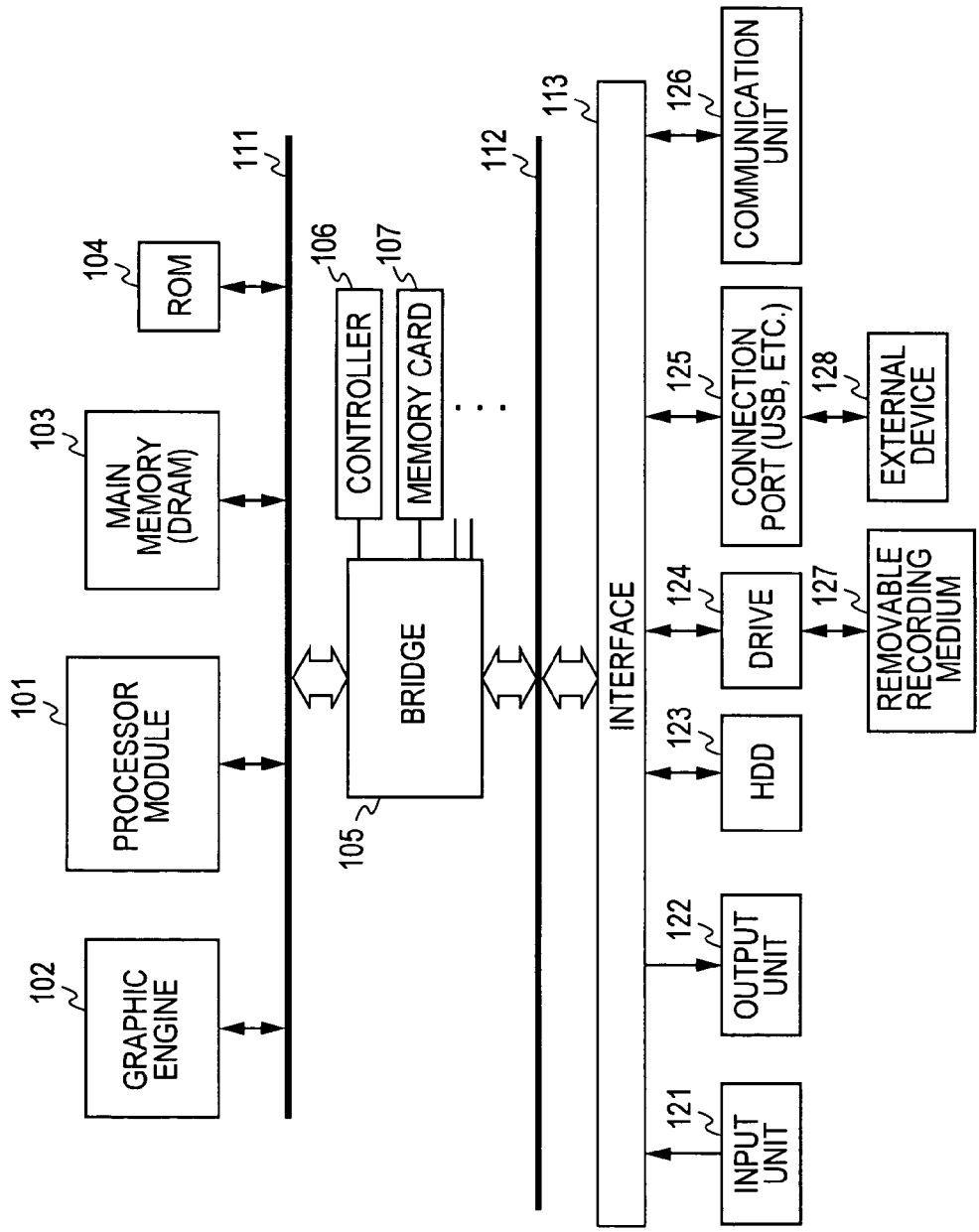
FIG. 1 is a block diagram of an information processing apparatus of one embodiment of the present invention.

An information processing apparatus, a process control method, and a computer program are described below with reference to the drawings.

The hardware structure of the information processing apparatus of one embodiment of the present invention is described below with reference to FIG. 1. A processor module 101 includes a plurality of processing units, and processes data in accordance with a variety of programs stored in a read-only memory (ROM) 104 and a hard disk drive (HDD) 123, including operating systems (OS's) and application programs running on the OS. The processor module 101 will be described later with reference to FIG. 2.

In response to a command input via the processor module 101, a graphic engine 102 generates data to be displayed on a screen of a display forming an output unit 122, for example, performs a three-dimensional graphic drawing process. A main memory (DRAM) 103 stores the program executed by the processor module 101 and parameters that vary in the course of execution of the program. These elements are interconnected via a host bus 111 including a CPU bus.

The host bus 111 is connected to an external bus 112, such as a peripheral component interconnect/interface (PCI) bus via a bridge 105. The bridge 105 controls data inputting and outputting between the host bus 111, the external bus 112, a controller 106, a memory card 107, and other devices.

An input unit 121 inputs information to an input device, such as a keyboard and a pointing device, operated by a user. An output unit 122 includes an image output unit, such as one of a liquid-crystal display and a cathode ray tube (CRT), and an audio output device such as a loudspeaker.

The hard disk drive (HDD) 123 drives a hard disk loaded therewithin, thereby recording or playing back a program to be executed by the processor module 101 and information.

A drive 124 reads data and programs stored in a loaded removable recording medium 127, such as a magnetic disk, an optical disk, a magneto-optic disk, a semiconductor memory, or the like, and supplies the data and the programs to a main memory (DRAM) 103 via an interface 113, the external bus 112, the bridge 105, and the host bus 111.

A connection port 125 connects to an external device 128, and may include a universal serial bus (USB), an IEEE (Institute of Electrical and Electronics Engineers) 1394 bus, or the like. The connection port 125 is connected to the processor module 101 via the interface 113, the external bus 112, the bridge 105, and the host bus 111. A communication unit 126, connected to a network, transmits data supplied from the HDD 123 or the like, and receives data from the outside.

The structure of the processor module 101 is described below with reference to FIG. 2. As shown, a processor module 200 includes a main processor group 201 including a plurality of main processor units, and a plurality of sub-processor groups 202 thorough 20n, each including a plurality of sub-processor units. Each group further includes a main controller and a secondary cache. The processor groups 201 through 20n, each including eight processor units, for example, are connected via one of a cross-bar architecture and a packet exchange network. In response to a command of the main processor of the main processor group 201, at least one sub-processor in the plurality of sub-processor groups 202 through 20n is selected to perform a predetermined program.

The main-flow controller in each processor group controls data inputting and data outputting to the main memory 103 of FIG. 1. The secondary cache serves as a memory area for process data in each processor group.

The operating systems (OS's) of the information processing apparatus of one embodiment of the present invention is described below with reference to FIG. 3. The multi-OS information processing apparatus has a plurality of OS's arranged in a logical layered structure as shown in FIG. 3.

Figure 2:
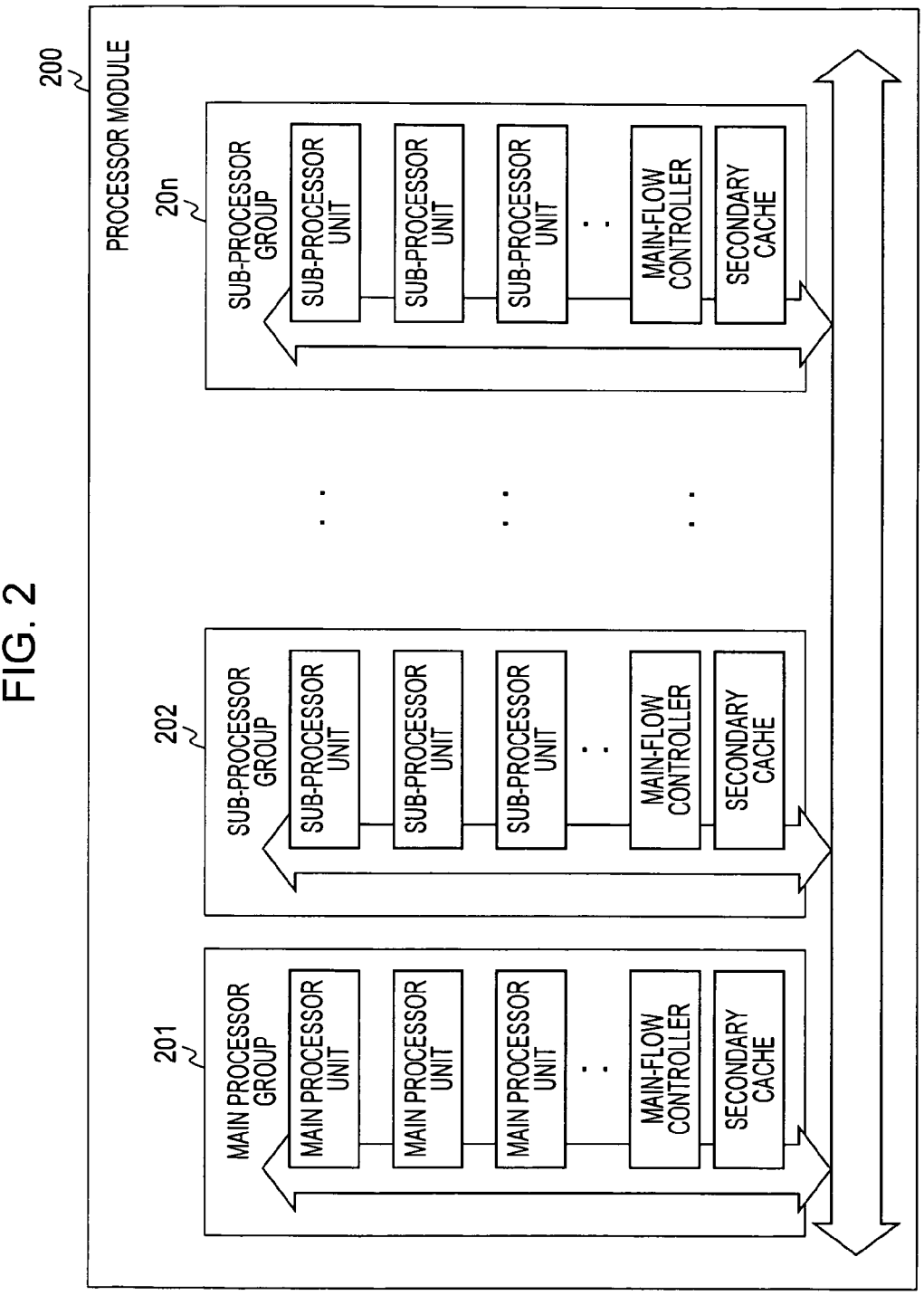
FIG. 2 illustrates the structure of a processor module in the information processing apparatus.
Figure 3:
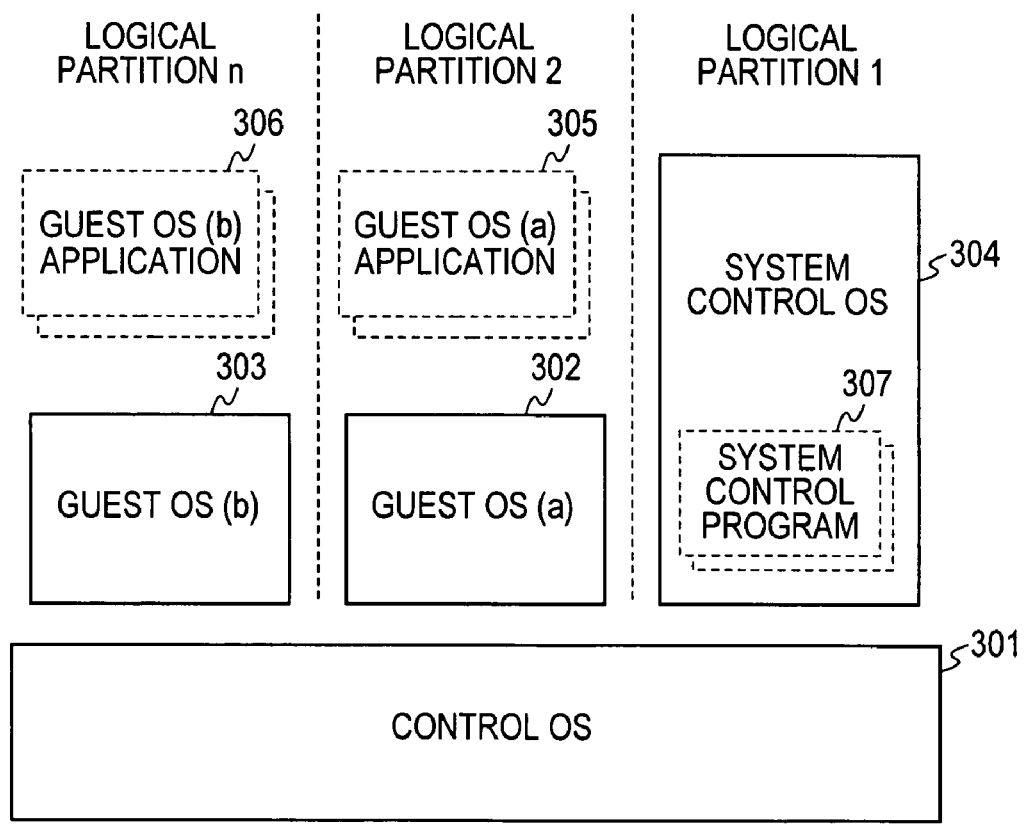
FIG. 3 illustrates the structure of operating systems in the information processing apparatus of one embodiment of the present invention.

As shown in FIG. 3, a main OS 301 is arranged at a lower layer. A plurality of sub OS's 302, 303, and 304 are arranged at upper layers. Sub OS's 302 and 303 are guest OS's, and sub OS 304 is a system control OS. Together with the system control OS 304, the main OS 301 forms a logical partition as an execution unit of each process executed by the processor module 101 discussed with reference to FIGS. 1 and 2, and allocates system hardware resources (for example, main processors, sub-processors, memories, and devices, as computing resources) to each logical partition.

The guest OS's 302 and 303 as the sub OS's are a gaming OS, Windows®, Linux®, etc., and operate under the control of the main OS 301. Although only two guest OS's 302 and 303 are shown in FIG. 3, the number of guest OS's is not limited to two.

The guest OS's 302 and 303 operate within the logical partitions set by the main OS 301 and the system control OS 304. The guest OS's 302 and 303 process a variety of data using hardware resources such as main processors, sub-processors, memories, and device, each allocated to the logical partition.

The guest OS(a) 302 uses the hardware devices including a main processor, a sub-processor, a memory, and a device allocated to the logical partition 2 set up by the control OS 301 and the system control OS 304, thereby executing an application program 305 corresponding to the guest OS(a) 302. The guest OS(b) 303 uses the hardware resources including a main processor, a sub-processor, a memory, and a device allocated to a logical partition "n", thereby executing an application program 306 corresponding to the guest OS(b) 303. The main OS 301 provides a guest OS programming interface required to execute the guest OS.

The system control OS 304 as one of the sub OS's generates a system control program 307 containing logical partition management program, and performs operation control responsive to the system control program 307 together with the main OS 301. The system control program 307 controls system policy using a system control program programming interface. The application program 306 is supplied with the system control program programming interface by the control OS 301. For example, the system control program 307 permits flexible customization, for example, setting an upper limit on resource allocation.

The system control program 307 controls the behavior of the system using the system control program programming interface. For example, the system control program 307 produces a new logical partition, and starts up a new guest OS at the logical partition. In a system where a plurality of guest OS's are operating, the guest OS's are initiated in the order programmed in the system control program 307. The system control program 307 can receive and examine a resource allocation request issued from the guest OS before being received by the main OS 301, modify the system policy, and deny the request itself. In this way, no particular guest OS monopolizes the resources. A program into which the system policy is implemented is the system control program.

The main OS 301 allocates a particular logical partition (for example, the logical partition 1 as shown in FIG. 3) to the system control OS 304. The main OS 301 operates in a hypervisor mode. The guest OS operates in a supervisor mode. The system control OS 304 and the application program operate in a problem mode (user mode).

The logical partition is an entity receiving a resource allocation in the system. For example, the main memory 103 is partitioned into several areas (see FIG. 1), and each logical partition is granted the right to use the respective area. The types of resources allocated to the logical partitions are listed below.

a) Physical processor unit usage time
b) Virtual address space
c) Memory accessible by program operating in a logical partition
d) Memory used by the control OS to manage the logical partition
e) Event port
f) Right to use device
g) Cache partition
h) Right to use bus As previously discussed, each OS operates within the logical partition. The OS monopolizes the resources allocated to the logical partition to process a variety of data. In many cases, one partition is produced for a guest OS, on a per guest OS basis, functioning on the system. Each logical partition is assigned a unique identifier. The system control OS 304 manages the system control program generated as logical partition management information by associating the system control program to the identifier.

The logical partition is generated by the main OS 301 and the system control OS 304. Immediately after production, the logical partition has no resources, and with no limitation set on available resources. The logical partition takes one of two states, an active state and an end state. The logical partition immediately after production takes an active state. The logical partition is transitioned into the end state in response to a request of a guest OS operating in the logical partition, and stops all logical processors allocated to the logical partition.

The logical processor is the one allocated to the logical partition, and corresponds to any physical processor, namely, a processor within a processor group of FIG. 2. The logical processor and the physical processor are not always related to each other in one-to-one correspondence. A single logical processor can correspond to a plurality of physical processors. Alternatively, a plurality of logical processors can correspond to a single physical processor. The correspondence between the logical processor and the physical processor is determined by the main OS 301.

The main OS 301 has a function to limit the amount of resources available to each logical partition. Limitation can be set to the amount of use of resources the guest OS 302 and the guest OS 303 can allocate and release without communicating with the system control OS 304.

Each logical partition includes a control signal port. A variety of control signals required for data exchanging and sharing between logical partitions reaches the control signal port. The control signals include a request to connect event ports between logical partitions, a request to connect message channels between logical partitions, and a request to connect to a shared memory area.

The control signal reaching each logical partition is queued by the control signal port. No limit is set to the depth of the queue within a range permitted by a memory resource. The memory resource required for queuing is reserved from the logical partition receiving the control signal. To pick up the control signal from the port, a guest OS programming interface is called. When the control signal arrives at an empty control signal port, an event can be transmitted to any event port. The event port is specified by calling the guest OS programming interface.

The control OS provides the logical partition with a logical sub-processor in an abstract form of a physical sub-processor as a computing resource. As previously discussed, the physical sub-processor is not related to the logical sub-processor in one-to-one correspondence, and it is not a requirement that the physical sub-processors be identical in number to the logical sub-processors. As necessary, the control OS can thus cause a single physical sub-processor to correspond to a plurality of logical sub-processors.

If the number of the logical sub-processors is larger than the number of physical sub-processors, the control OS uses the physical sub-processors in a time sharing manner. The logical sub-processor can repeatedly stop and then resume operation. The guest OS can monitor such changes.

An entity processing data is set up as a partition. More specifically, a logical partition is set up as an entity that shares resources in a system. A variety of resources such as use time of the physical processor, virtual address space, and memory space are allocated to the logical partition. The process is then performed using the allocated resources. A logical processor corresponding to any physical processor is set up in the logical partition, and data processing is performed based on the logical processor. The logical processor does not always correspond to the physical processor on a one-to-one correspondence. For example, a single logical processor can correspond to a plurality of physical processors, and a plurality of logical processors can correspond to a single physical processor.

If a plurality of processes are performed in parallel using the logical processor, the physical processor is used by scheduling the plurality of logical processors. More specifically, the plurality of logical processors uses the physical processor in a time sharing manner.

Figure 4:
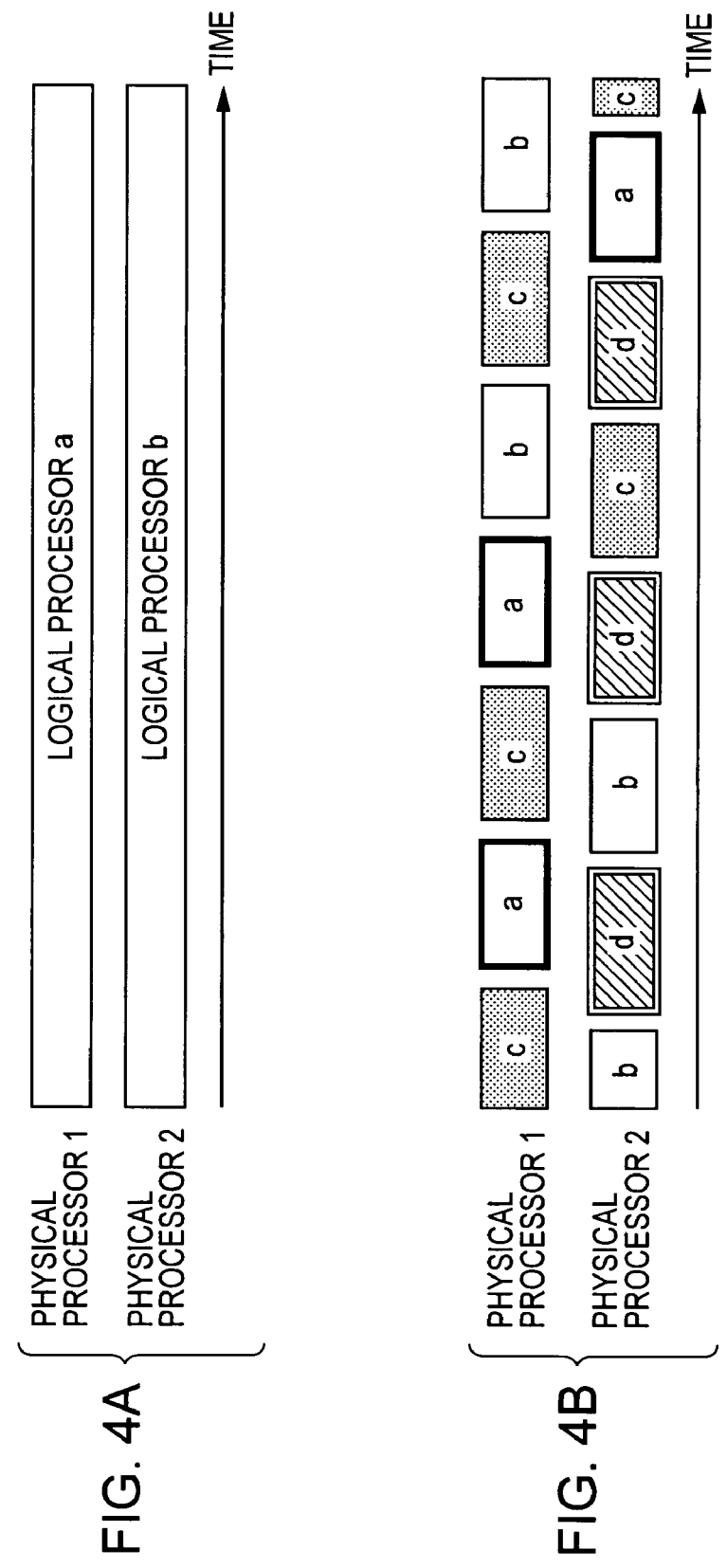
FIGS. 4A and 4B illustrates allocation of a logical processor to a physical processor in a time sharing manner.

Referring to FIGS. 4A and 4B, how to use the physical processor in a time sharing manner is discussed. As shown in FIG. 4A, a single logical processor corresponding to one of the main operating system and the sub operating system is allocated to a single physical processor. A logical processor "a" monopolizes a physical processor 1, and a logical processor "b" monopolizes a physical processor 2.

As shown in FIG. 4B, a plurality of logical processors, assigned to a single physical processor, perform processes in a time sharing manner. The physical processor 1 is shared in time in the order of the logical processors c→a→c→a→b→c→b. Each logical processor corresponding to the process of one of the main operating system and the sub operating system is performed. The physical processor 2 is shared in time in the order of the logical processors b→d→b→d→c→d→a. Each logical processor corresponding to the process of one of the main operating system and the sub operating system is performed.

Figure 5:
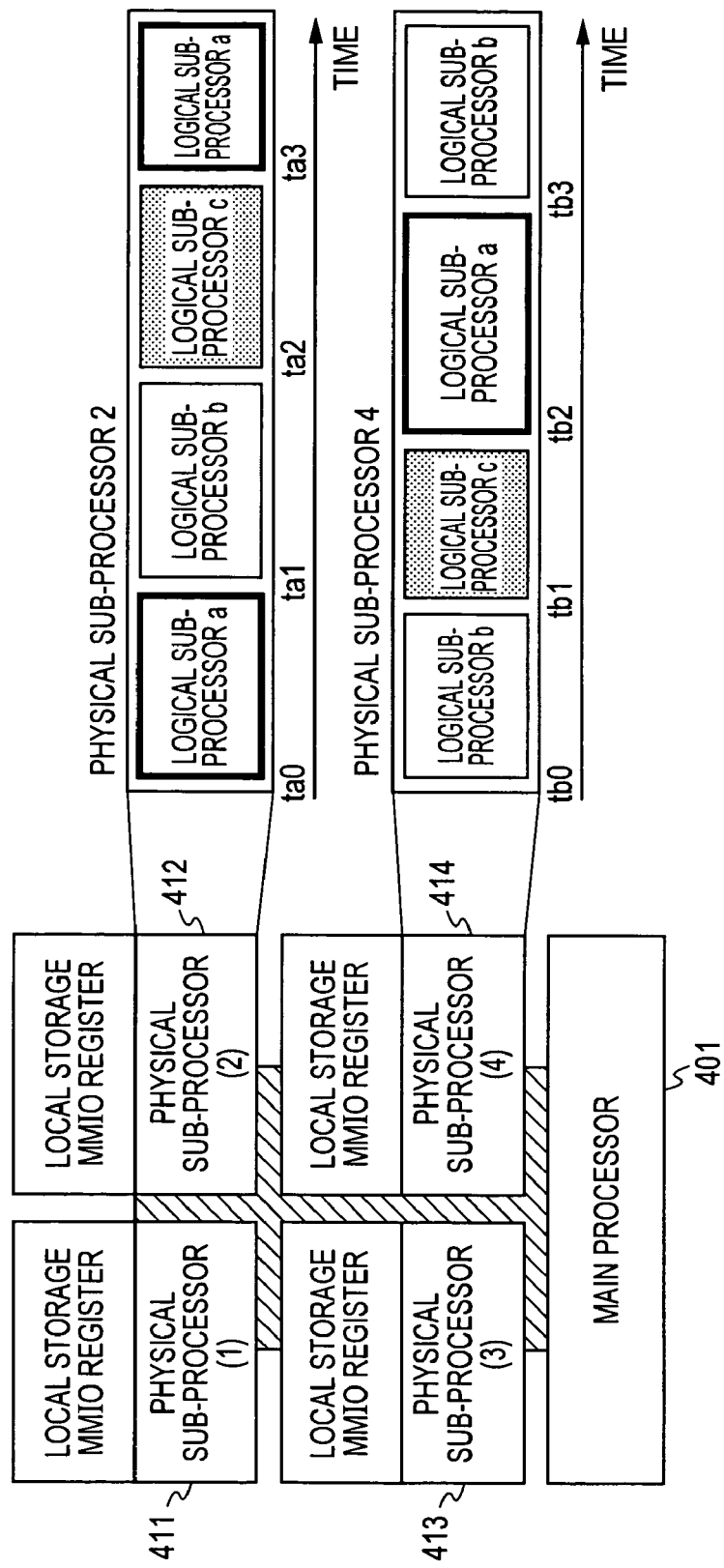
FIG. 5 illustrates an allocation process between the logical processor and the physical processor.

As shown in FIG. 5, the correspondence between the physical processor and the logical processor is described below. FIG. 5 illustrates the structure of a single main processor 401, and physical sub-processors 411 through 414, and a time sequence of a physical sub-processor 2 and a physical sub-processor 4 operating in a time sharing manner.

As shown in FIG. 5, logical sub-processors are allocated to the physical sub-processor 2 in a time sharing as listed below.
Time slot ta0-ta1: logical sub-processor a
Time slot ta1-ta2: logical sub-processor b
Time slot ta2-ta3: logical sub-processor c
Time slot ta3-: logical sub-processor a
In each allocation time slot, each logical sub-processor performs a process using the physical sub-processor 2.

The physical sub-processor 4 is shared by the logical sub-processors as listed below.
Time slot tb0-tb1: logical sub-processor b
Time slot tb1-tb2: logical sub-processor c
Time slot tb2-tb3: logical sub-processor a
Time slot tb3-: logical sub-processor b
In each allocation time slot, each logical sub-processor performs a process using the physical sub-processor 4.

The logical sub-processors time divides the physical processors to perform respective processes. To resume data processing operation with the physical processor during a next allocation time slot, each logical sub-processor needs to hold status information, such as hardware state during a data process suspension time. The status information contains the content of a local storage of the physical processor, and the content of a memory-mapped input and output (MMIO) register. The MMIO is an input and output control mechanism for controlling hardware in memory mapping. The MMIO performs a write process and a read process using a particular memory location, thereby controlling hardware.

While the logical sub-processor is allocated to the physical processor, an MMIO area and a local storage area of the physical processor accounting for the state of the logical sub-processor are mapped to an area in a logical partition address space corresponding to the logical sub-processor.

The address space and an address conversion (mapping) mechanism defined in the information processing apparatus of one embodiment of the present invention are described below with reference to FIG. 6.

Figure 6:
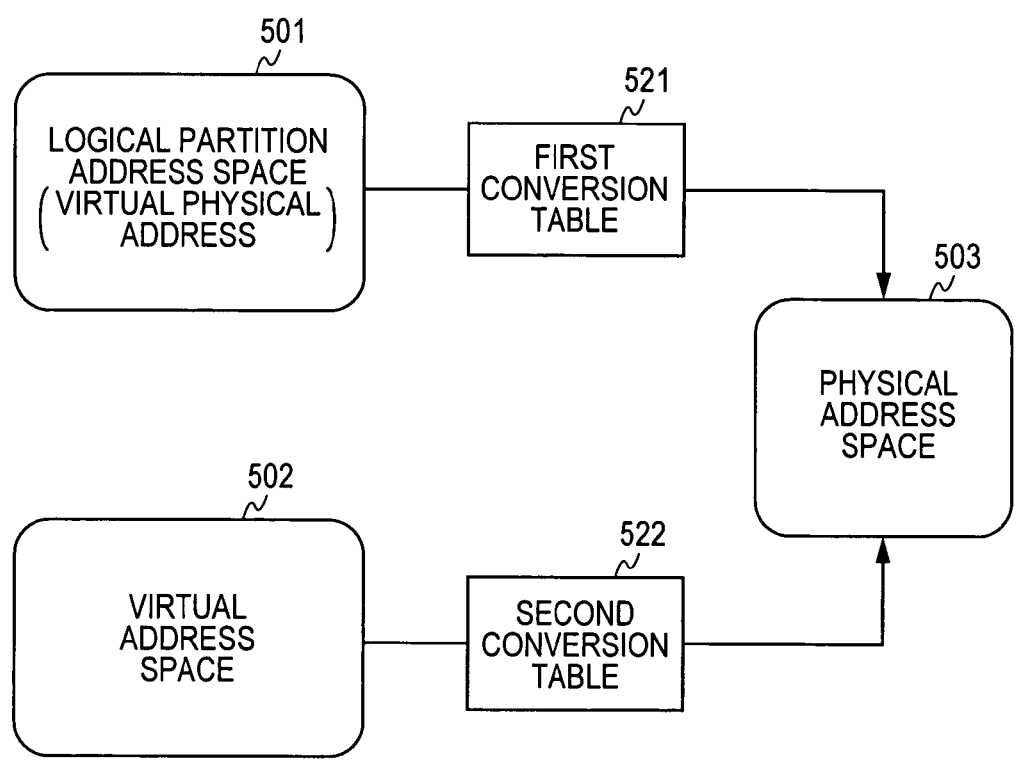
FIG. 6 illustrates an address space and a conversion table as an address conversion mechanism in the information processing apparatus of one embodiment of the present invention.

FIG. 6 illustrates a logical partition address (virtual physical address) space 501, a virtual address space 502, a physical address space 503, and as address conversion mechanism of address space, a first conversion table 521 converting the logical partition address space 501 into the physical address space 503, and a second conversion table 522 converting the virtual address space 502 into the physical address space 503.

The logical partition address space 501 is an address space in an abstract form of the physical address space 503, and is produced at the same time a system control program produces a logical partition. The logical partition address space 501 contains an area accessible by the logical processor. The logical partition address space 501 is set up for each logical partition set corresponding to a guest operating system (OS) previously discussed with reference to FIG. 3.

The virtual address space 502 is directly used by the guest OS. The guest OS generates a new virtual address as necessary. The guest OS can generate a plurality of virtual address spaces in the logical partition if necessary. The physical address space 503 is a real address space. An address in the physical address space 503 is used to specify an access target on a bus.

The first conversion table 521 and the second conversion table 522 are used to convert address spaces. The first conversion table 521 converts a logical partition address (virtual physical address) space into the physical address space 503. The structure of the first conversion table 521 is described below with reference to FIG. 7.

Figure 7:
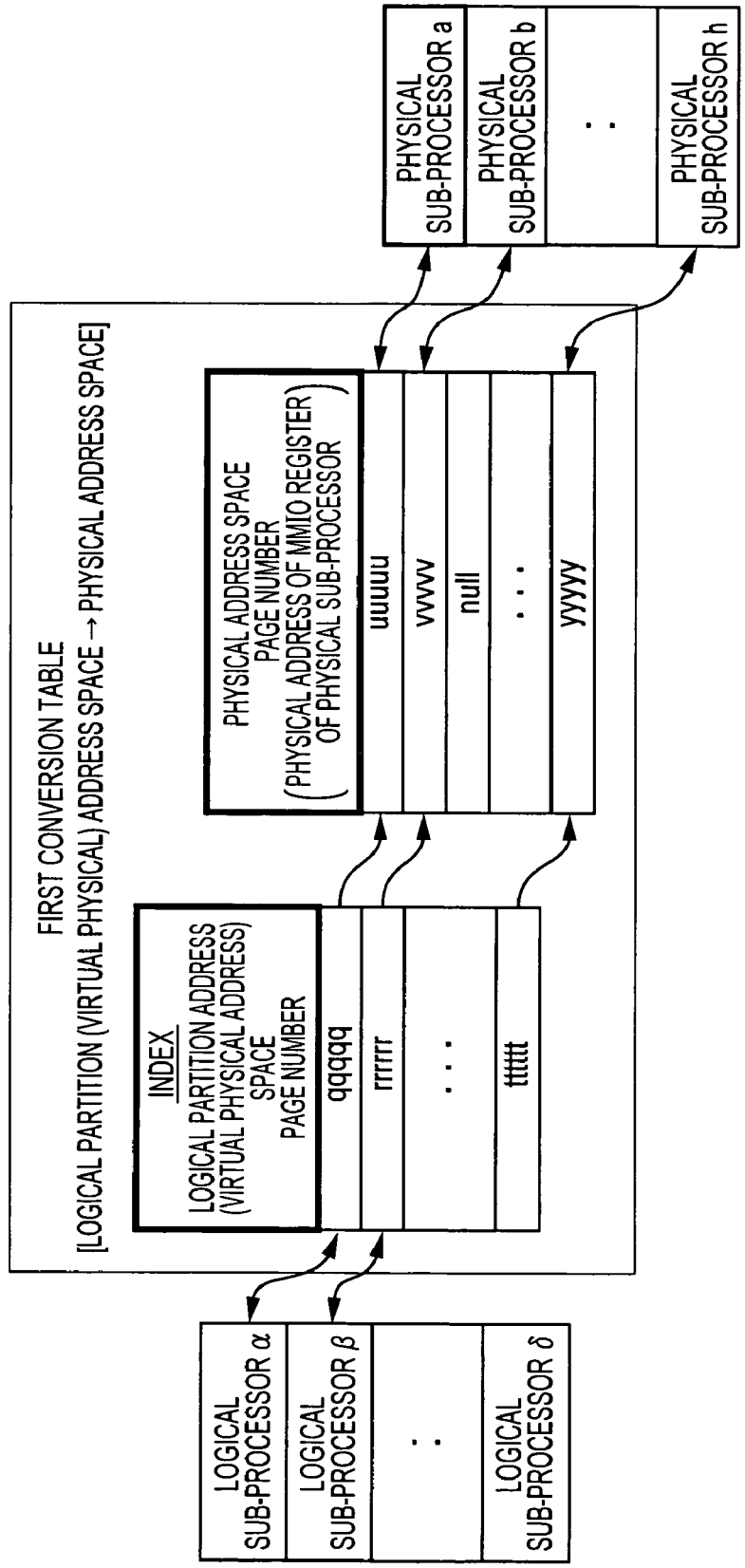
FIG. 7 illustrates a first conversion table applied to the information processing apparatus of one embodiment of the present invention.

As shown in FIG. 7, the first conversion table has, as an index, a page number of the logical partition address space to reference a page of the corresponding physical address space. Set as a page number of the physical address space is a physical address of a MMIO register of the physical processor. A particular physical processor is identified by set physical address. The page number of the logical partition address space, as the index, is accessible by the logical processor. In accordance with the first conversion table, the logical sub-processor is allocated to the physical sub-processor.

An effective physical address or a null indicating that the corresponding entry is invalid is set at the page number of the physical address (physical address of the MMIO register of the physical processor) referenced in response to the index (the page number of the logical partition address space). The value of the physical address is updated by the control OS as necessary.

Figure 8:
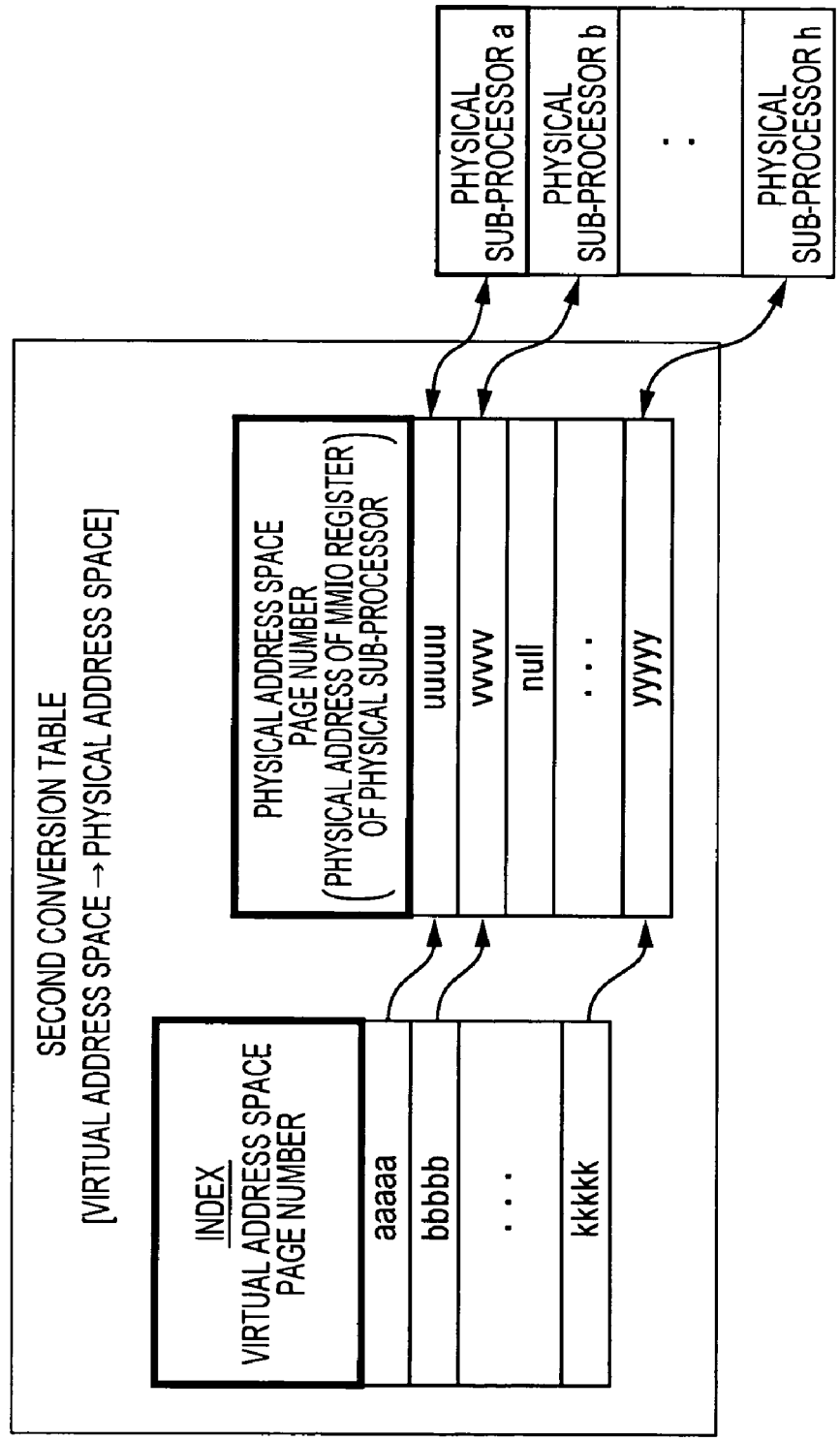
FIG. 8 illustrates a second conversion table applied to the information processing apparatus of one embodiment of the present invention.

The second conversion table is described below with reference to FIG. 8. The second conversion table is used to convert the virtual address space 502 into the physical address space 503. The second conversion table contains, as an index, the page number of the virtual address space with which a page of the corresponding physical address space is referenced. The physical address of the MMIO register of the physical processor is set as the page number of the physical address space. A particular physical sub-processor is identified based on the set physical address. The page number of the virtual address space as the index is accessible by the guest OS. The process of the physical sub-processor identified by the allocation relationship in the second conversion table is performed.

The effective physical address or a null indicating that the corresponding entry is invalid is set at the page number of the physical address (physical address of the MMIO register of the physical processor) referenced in response to the index (the page number of the logical partition address space). The value of the physical address is updated by the control OS as necessary.

Figure 9:
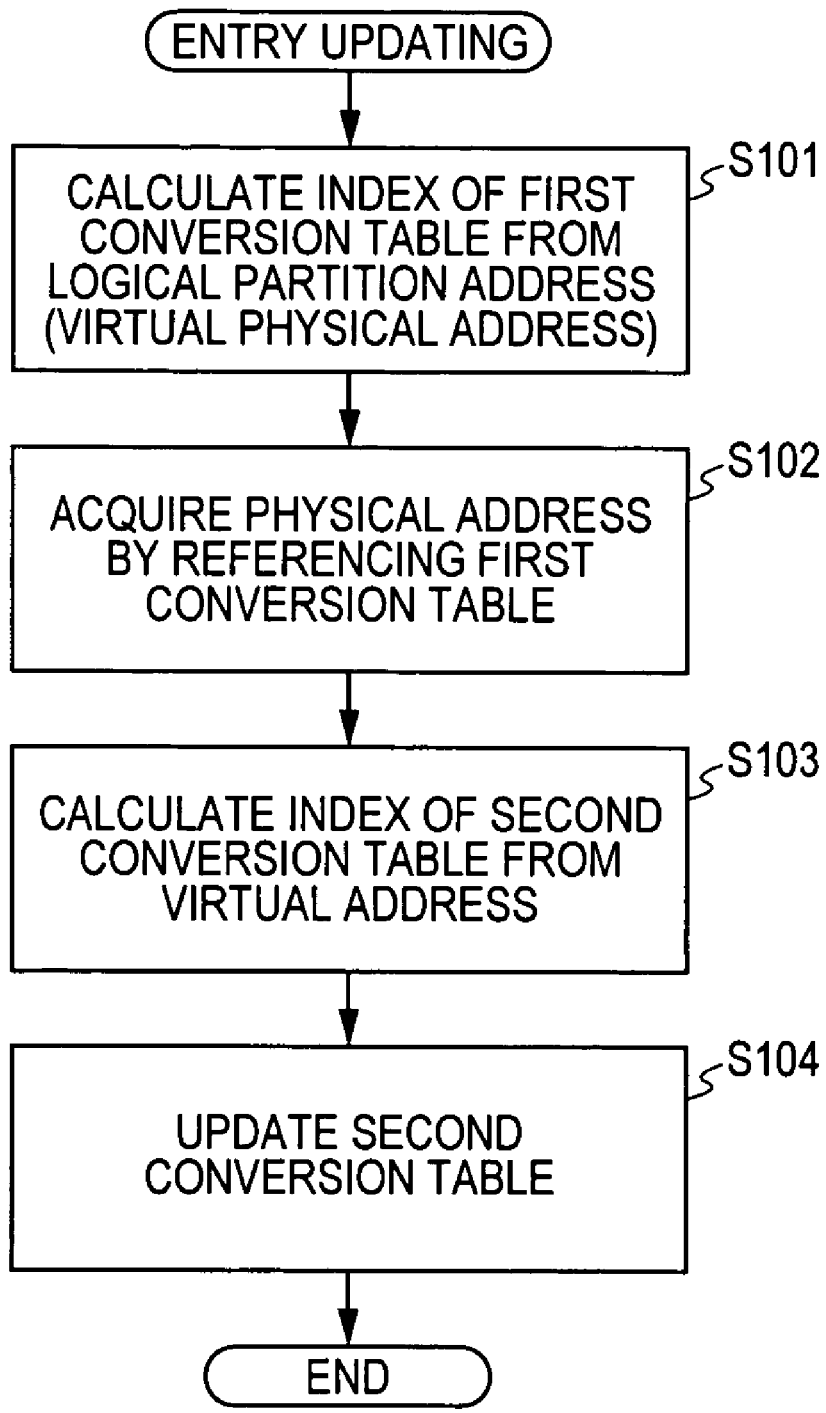
FIG. 9 is a flowchart illustrating an update process of entries in the conversion table.
Figure 10:
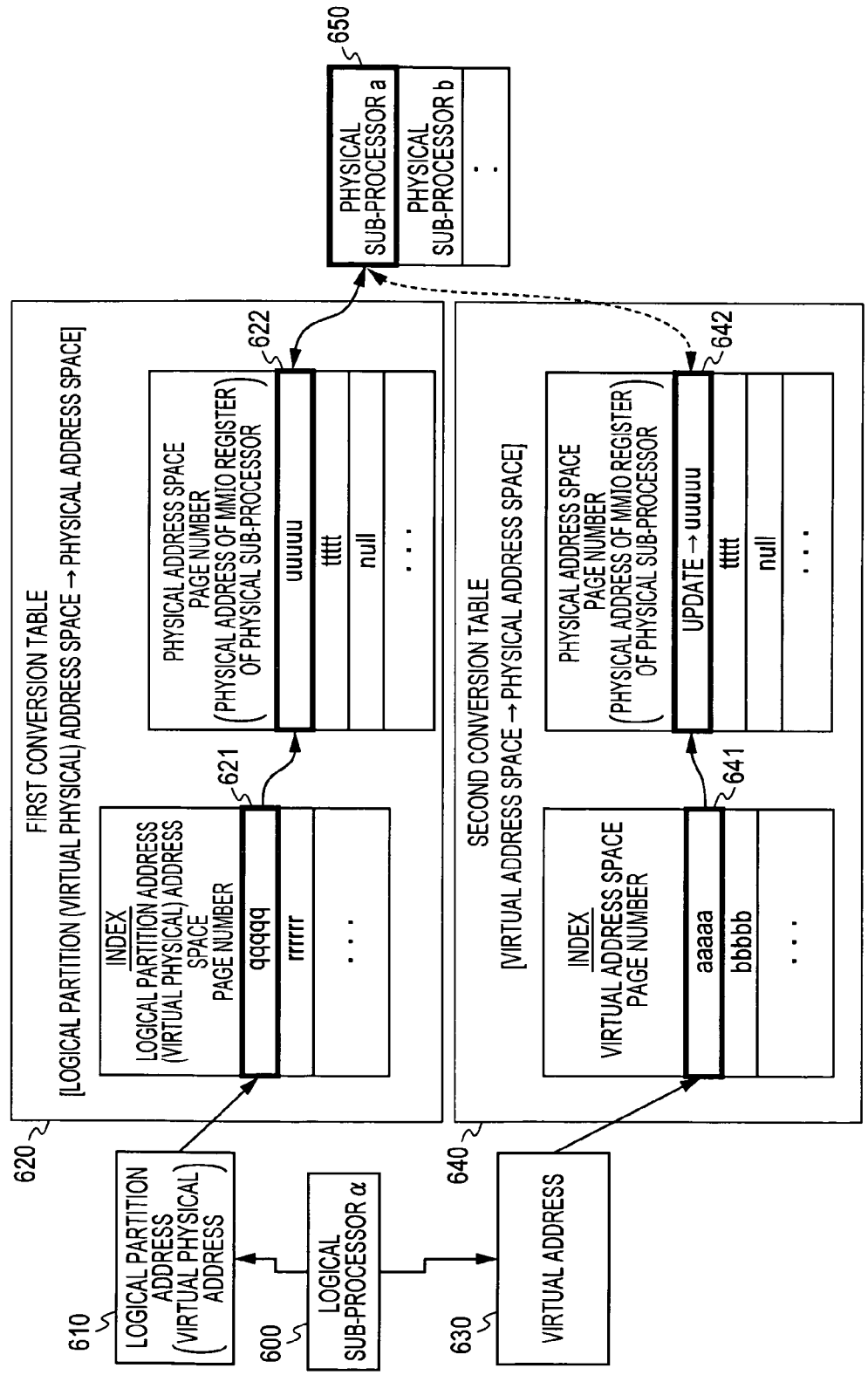
FIG. 10 specifically illustrates the update process of the entries in the conversion process.

An entry update processing sequence of the first conversion table and the second conversion table performed by the control OS is described below with reference to FIGS. 9 and 10. In this update process, the logical processor corresponding to the logical partition is allocated to the physical processor.

The entry update processing sequence of the tables is described below with reference to a flowchart of FIG. 9. In step S101, the index of the first conversion table is calculated from the logical partition address (virtual physical address). The logical partition address is an address in the address space set for each partition set up corresponding to a guest OS as discussed with reference to FIG. 3. The index of the first conversion table corresponding to the address is determined. In step S102, the physical address is determined from the first conversion table in accordance with the determined index.

This process is described below with reference to FIG. 10. An index [qqqqq] 621 of a first conversion table 620 is determined from a logical partition address (virtual physical address) 610. A physical address [uuuuu] 622 corresponding to the index [qqqqq] 621 is then determined. The logical partition address 610 is an address in the address space corresponding to the logical partition set in one of the guest OS's of FIG. 3, and is used by a logical sub-processor 600 corresponding to the logical partition.

In step S103, the index of the second conversion table is calculated from the virtual address. In step S104, the second conversion table is updated.

This process is described below with reference to FIG. 10. An index [aaaaa] 641 of a second conversion table 620 is determined from a virtual address 630. A physical address [uuuuu] 642 corresponding to the index [aaaaa] 641 is updated. As a result, the physical sub-processor accessible by the logical partition address 610 and the physical sub-processor accessible by the virtual address are set as the same physical sub-processor 650 as shown in FIG. 10. The virtual address 630 is an address in the virtual address space set in the logical partition in one of the guest OS's of FIG. 3, and is used by the logical sub-processor 600 corresponding to the logical partition.

The logical sub-processor is allocated to the physical sub-processor by updating the conversion table. The logical sub-processor associated with the logical partition can execute a process by applying the physical sub-processor associated by the first conversion table and the second conversion table.

Figure 12:
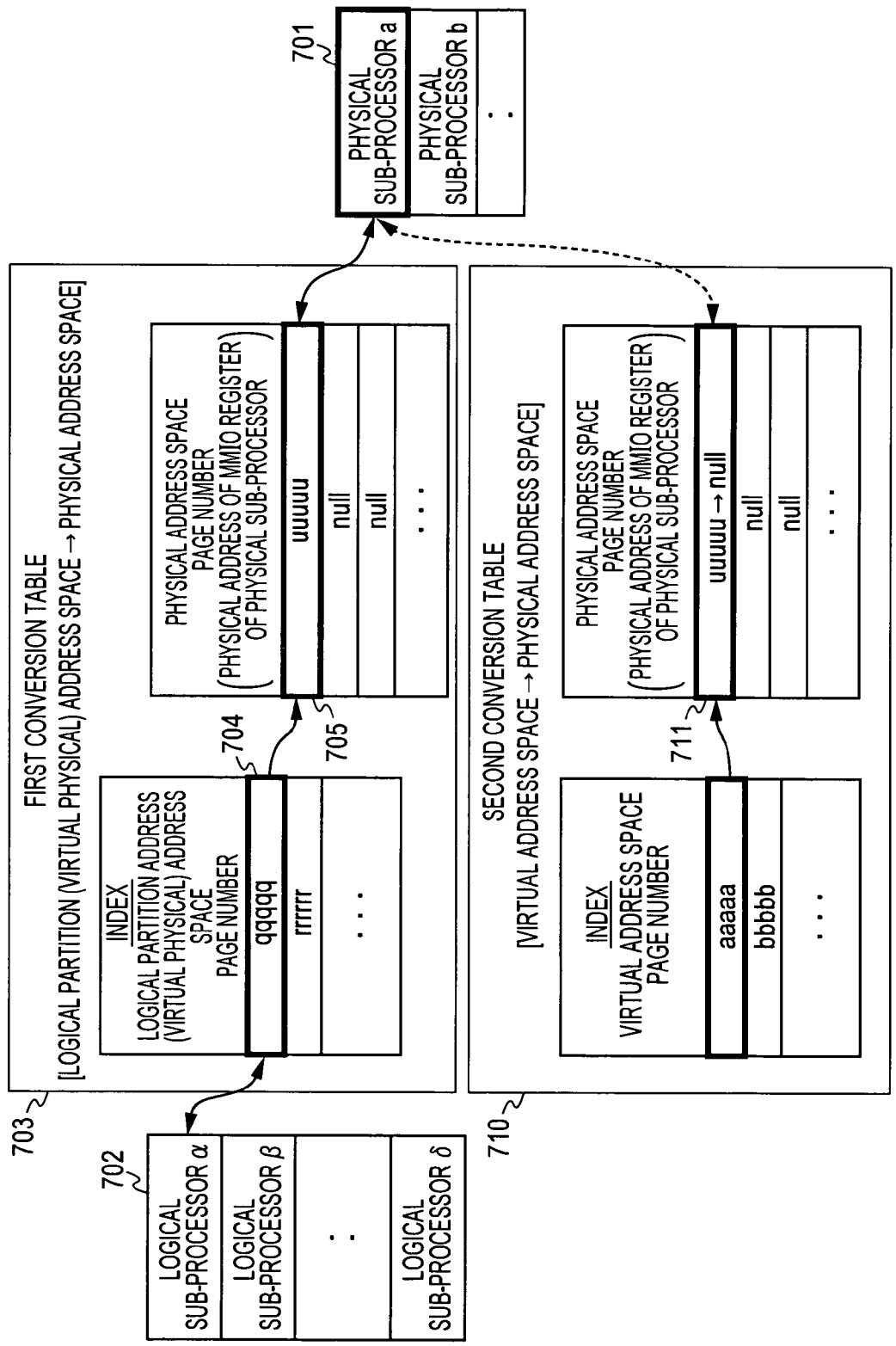
FIG. 12 specifically illustrates a process of updating the allocation relationship between the logical processor and the physical processor.
Figure 13:
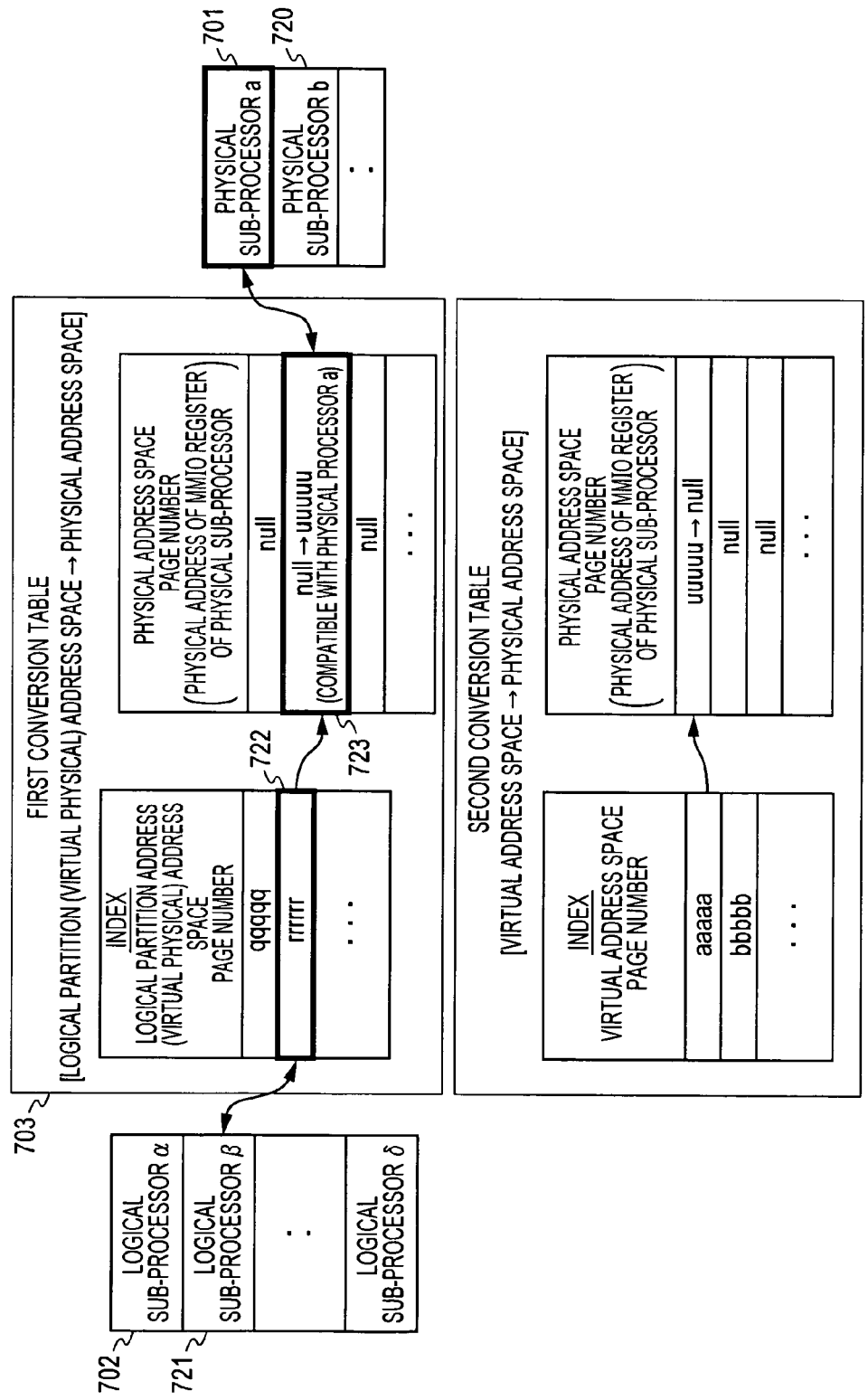
FIG. 13 specifically illustrates a process of updating the allocation relationship between the logical processor and the physical processor.

A switching process of the logical sub-processor is described below with reference to a flowchart of FIG. 11 and process examples of FIGS. 12 and 13. In the switching process, the logical sub-processor to physical sub-processor allocation relationship is cancelled concerning the physical sub-processor corresponding to the logical sub-processor executing data processing in the logical partition corresponding to the guest OS of FIG. 3, and another logical sub-processor is allocated to a new physical sub-processor. More specifically, the allocation relationship between the logical sub-processor and the physical sub-processor is updated. This process is performed by the control OS.

In step S201, an index of the first conversion table corresponding to the logical sub-processor allocated to the physical sub-processor in need of allocation updating is acquired. In step S202, the physical address is acquired based on the acquired index.

This process is described below with reference to FIG. 12. A physical sub-processor a701 needs allocation updating. The index of a first conversion table 703 corresponding to a logical sub-processor α702 allocated to the physical sub-processor a701 is index [qqqqq] 704. In step S201, the index [qqqqq] 704 is acquired, and in step S 202, a physical address [uuuuu] 705 is acquired based on the index [qqqqq] 704.

In step S203, all entries holding the physical address [uuuuu] are nulled in the second conversion table. For example, with reference to FIG. 12, an entry 711 holding the physical address [uuuuu] in a second conversion table 710 is nulled. FIG. 12 shows only one entry having the physical address [uuuuu]. A plurality of entries having the physical address [uuuuu] can be present. If a plurality of entries having the physical address [uuuuu] are present, all entries are nulled. With this process, the logical sub-processor α702 cannot use the physical sub-processor a701 in data processing.

In step S204, an index of the first conversion table corresponding to a logical sub-processor need to be allocated to a new physical sub-processor is acquired. In step S205, a physical address of a MMIO register of the physical sub-processor in need of new allocation is stored in the first conversion table.

This process is described below with reference to FIG. 13. It is desired to allocate a logical sub-processor β721 to the physical sub-processor a701. In step S204, the index of a first conversion table 703 corresponding to the logical sub-processor β721, namely, an index [rrrrr] 722 is acquired. In step S205, a physical address [uuuuu] of a MMIO register of the physical sub-processor a701 is stored in the first conversion table 703.

With this process, the logical sub-processor β721 is allocated to physical sub-processor a701, and the process of the logical sub-processor β721 is continuously performed.

Figure 11:
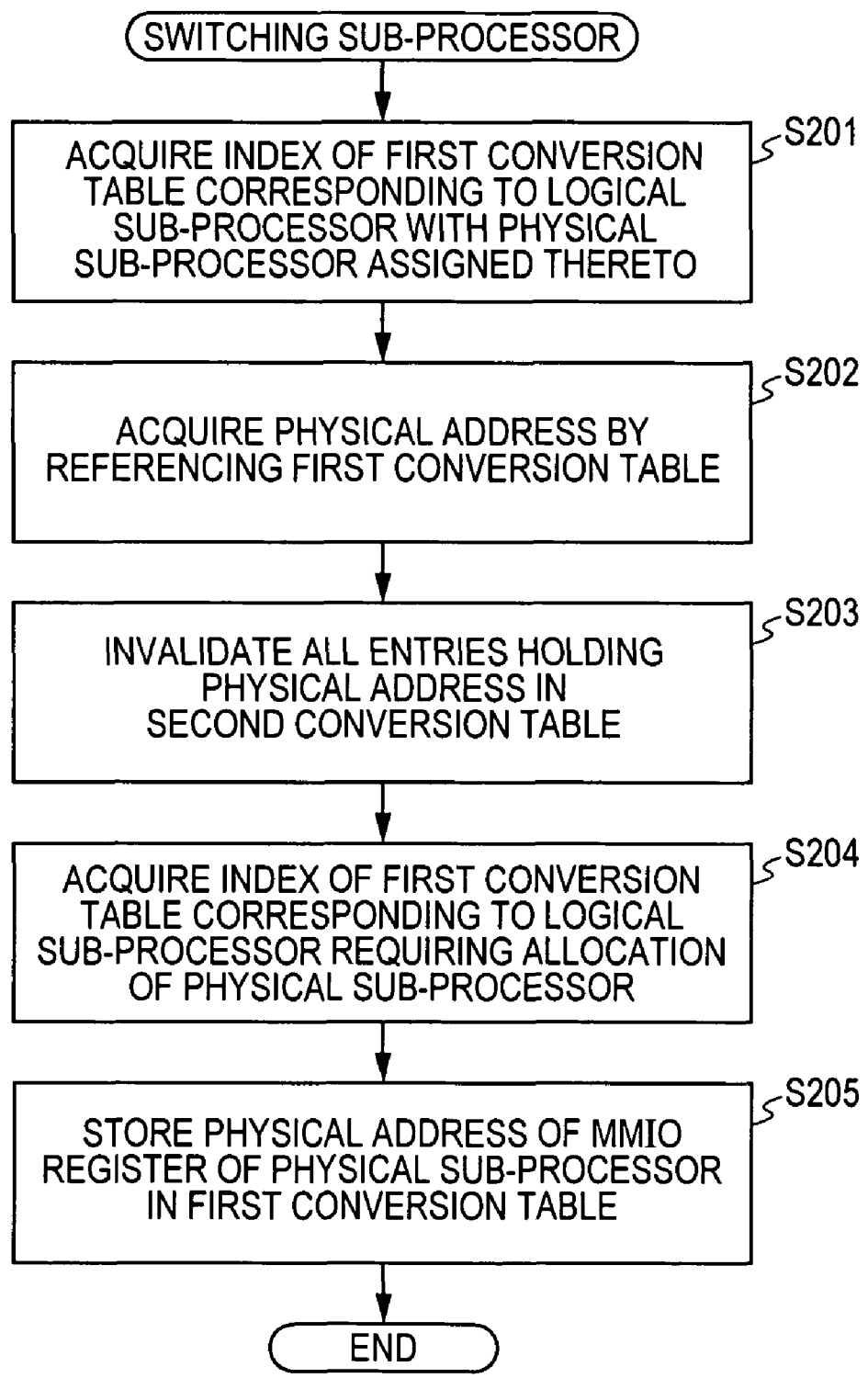
FIG. 11 is a flowchart illustrating a process of updating the allocation relationship between the logical processor and the physical processor.
Figure 14:
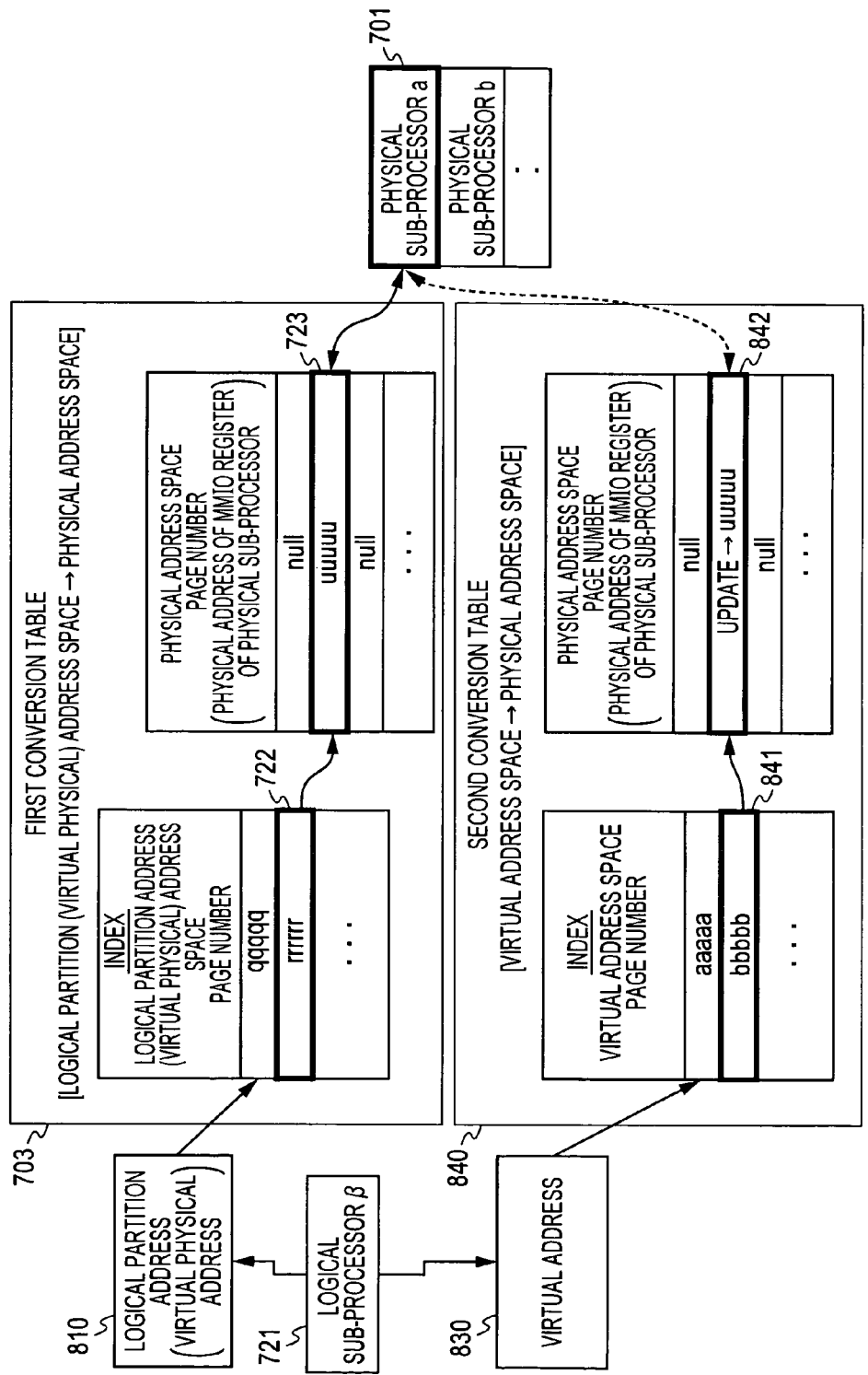
FIG. 14 specifically illustrates a process of updating the allocation relationship between the logical processor and the physical processor.

The update process of entry described with reference to FIG. 11 is executed. This process is described below with reference to FIG. 14. An index [bbbbb] 841 of a second conversion table 840 is determined from a virtual address 830. A physical address corresponding to the index [bbbbb] 841 is updated to [uuuuu] 842. As a result, a physical sub-processor accessible by a logical partition address (virtual physical address) 810 and a physical sub-processor accessible by the virtual address are set as being the same physical sub-processor a701 as shown in FIG. 14.

Figure 15:
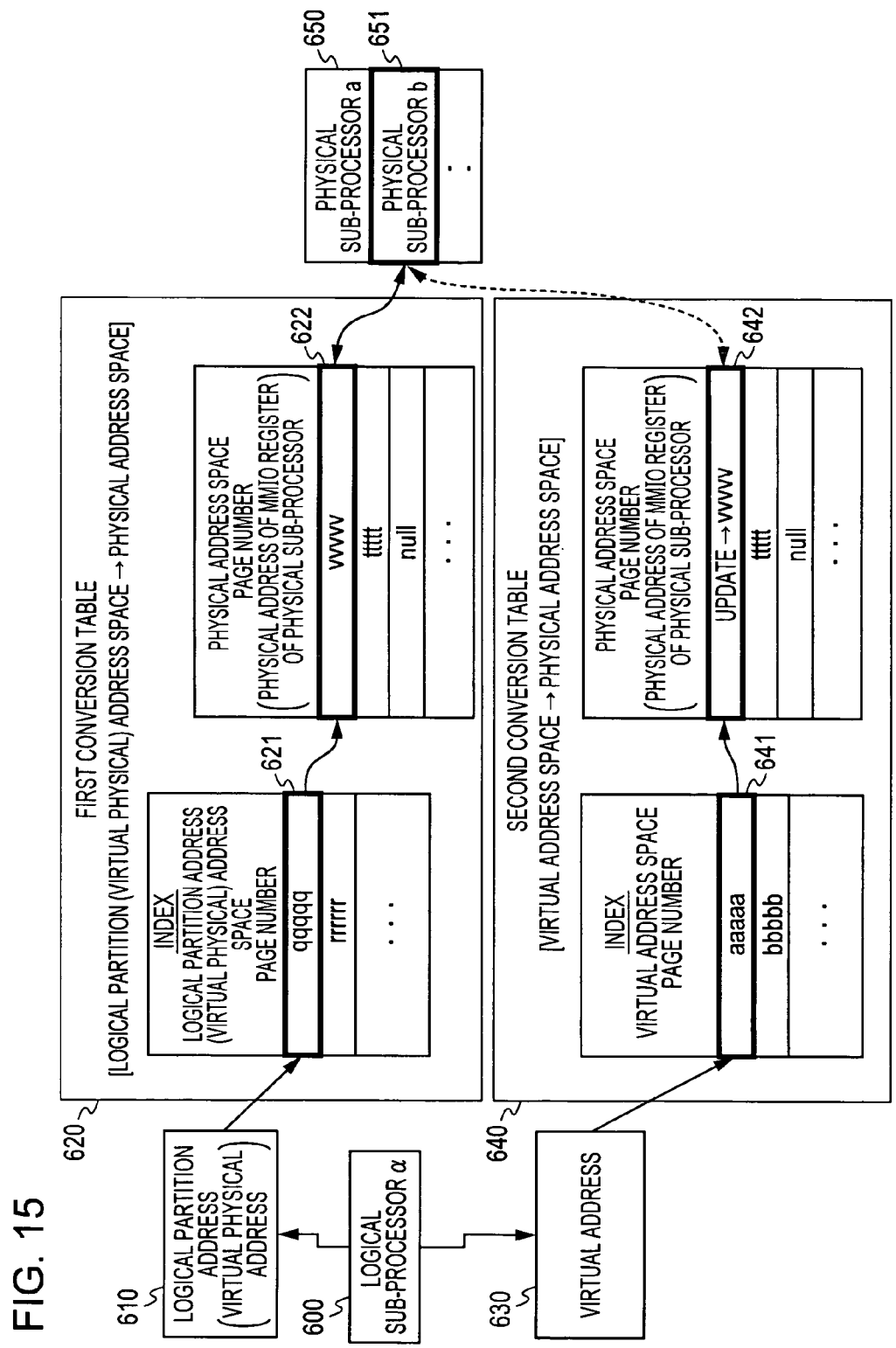
FIG. 15 specifically illustrates a process of updating the allocation relationship between the logical processor and the physical processor.

In the above discussion, the logical processor, different from the logical processor currently allocated to the physical process, is newly allocated. Alternatively, the physical processor with the logical processor allocated thereto is replaced. As shown in FIG. 15, the logical sub-processor α600 is allocated to a physical sub-processor b651 by storing a physical address [vvvvv] 622 of a MMIO register of the physical sub-processor b651 into the first conversion table 620.

The switching operation of the physical processor is performed to switch processors to prevent overheating that is generated if a single physical processor continuously processes data. When a continuous operation time of a single physical processor reaches a maximum continuous processor operation time, the control OS performs the processor switching operation discussed with reference to FIG. 15. The logical to physical processor allocation relationship is modified to perform process with a new physical processor.

Figure 16:
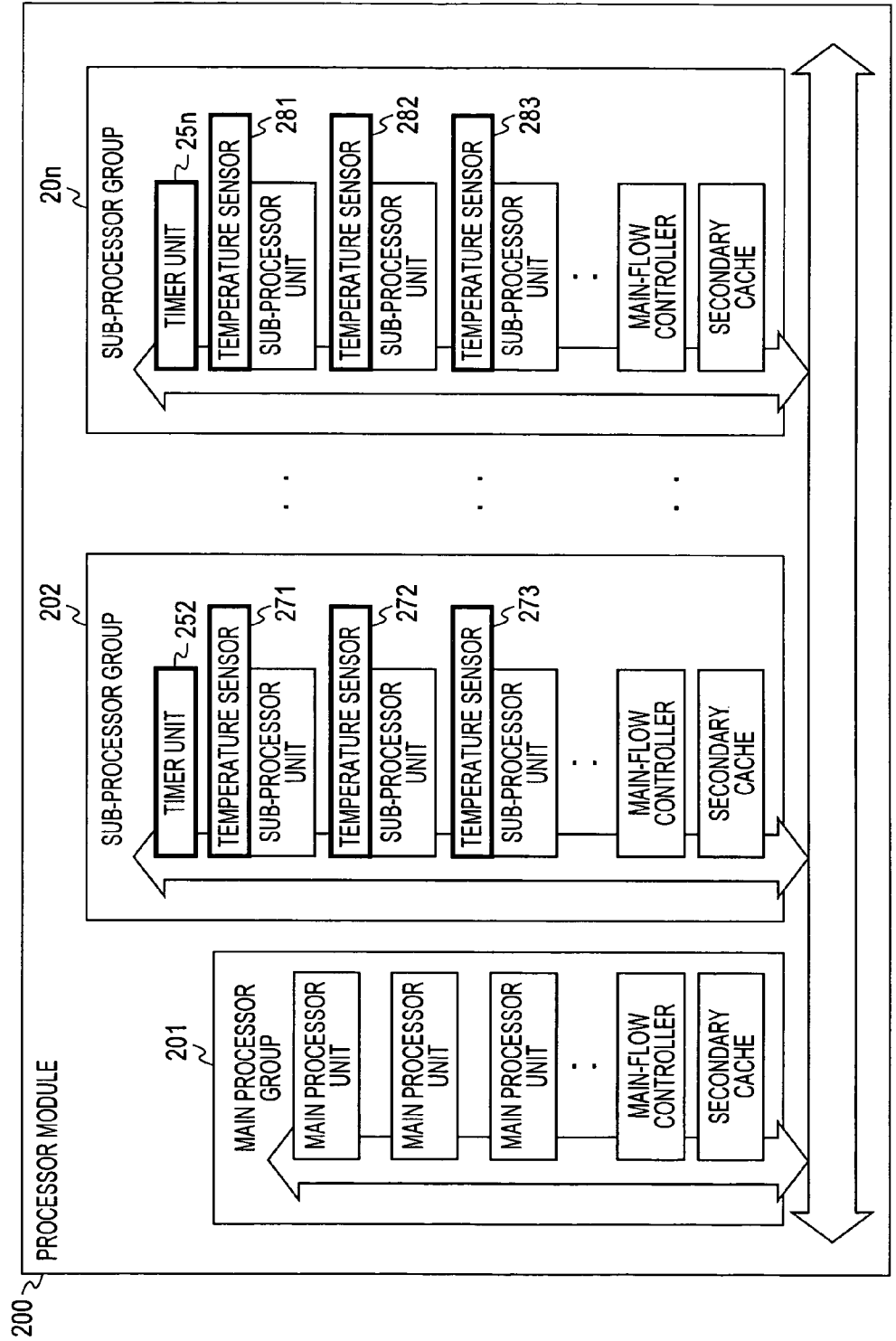
FIG. 16 illustrates the structure of a processor module having a timer and a temperature sensor.

As shown in FIG. 16, a processor module 200 includes timer units 252 through 25*n* in each of sub-processor groups 202 through 20*n*. The timer units 252 through 25*n* measure process times of the sub-processor groups 202 through 20*n* as physical processors. After a constant time elapse, the allocation relationship between the logical processor and the physical processor is updated. Temperature sensors 271 through 273, and 281 through 283 are arranged close to the physical processors as the sub-processor units of FIG. 16 to detect temperature rise in each processor. If the detected temperature reaches a predetermined temperature threshold, the allocation relationship between the logical processor and the physical processor is switched to control excessive temperature rise.

To switch the allocation relationship between the logical processor and the physical processor, a time-dependent processor switching process, a temperature-dependent processor switching process, or a combination of both can be used. In the time-dependent processor switching process, the processors are switched every constant duration of time in response to time measured by the timer units 252 through 25*n* arranged in the sub-processor groups 202 through 20*n*. In the temperature-dependent processor switching process, the allocation relationship between the logical processor and the physical processor is switched when the temperature rise detected by each of the temperature sensors 271 through 273 and 281 through 283 arranged close to the physical processors reaches the predetermined temperature threshold. The switching process of the allocation relationship between the logical processor and the physical processor is performed in the processor switching operation discussed with reference to FIG. 15.

Figure 17B:
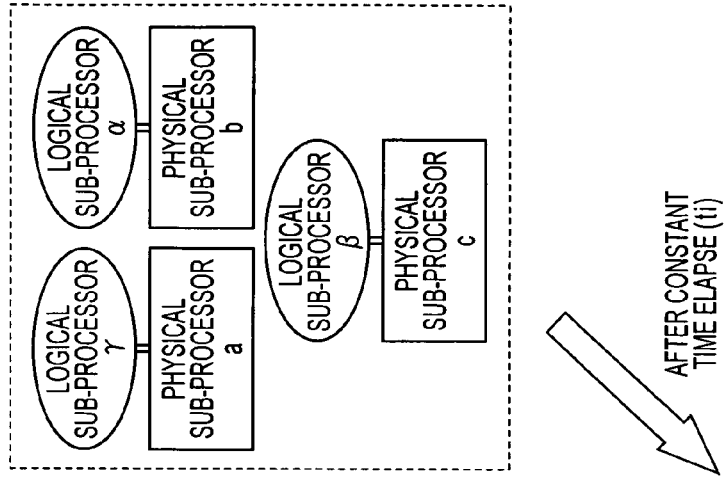
FIGS. 17A-17C illustrate a switching process of switching a time-dependent allocation relationship between the logical processor and the physical processor.
Figure 17C:
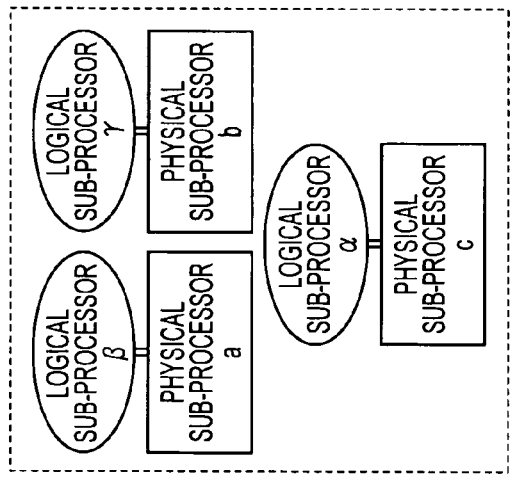
Figure 17A:
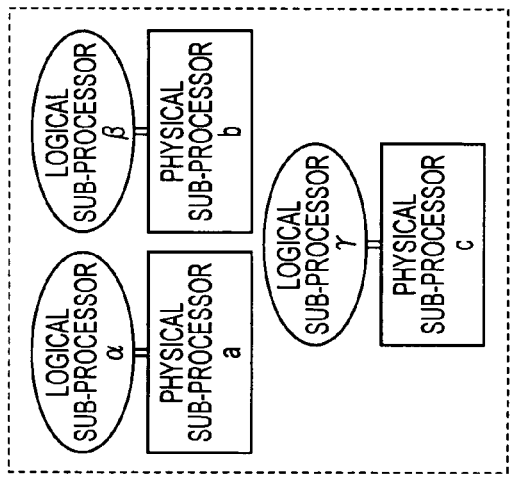

FIGS. 17A-17C illustrate the concept of the time-dependent processor switching process switching the allocation relationship between the logical processor and the physical processor every predetermined constant period (ti).

As shown in FIG. 17A, the allocation relationship between the logical processor and the physical processor at time T0 is as follows:
  logical processor α=physical processor a;
  logical processor β=physical processor b; and
  logical processor γ=physical processor c.

As shown in FIG. 17B, the allocation relationship between the logical processor and the physical processor at time T1 after a time elapse of ti from time T0 is as follows:
  logical processor γ=physical processor a;
  logical processor α=physical processor b; and
  logical processor β=physical processor c.

As shown in FIG. 17C, the allocation relationship between the logical processor and the physical processor at time T2 after a time elapse of ti from time T1 is as follows:
  logical processor β=physical processor a;
  logical processor γ=physical processor b; and
  logical processor α=physical processor c.

The allocation relationship is further repeatedly cycled in the order of the allocations of FIGS. 17A, FIG. 17B, and 17C.

Figure 18B:
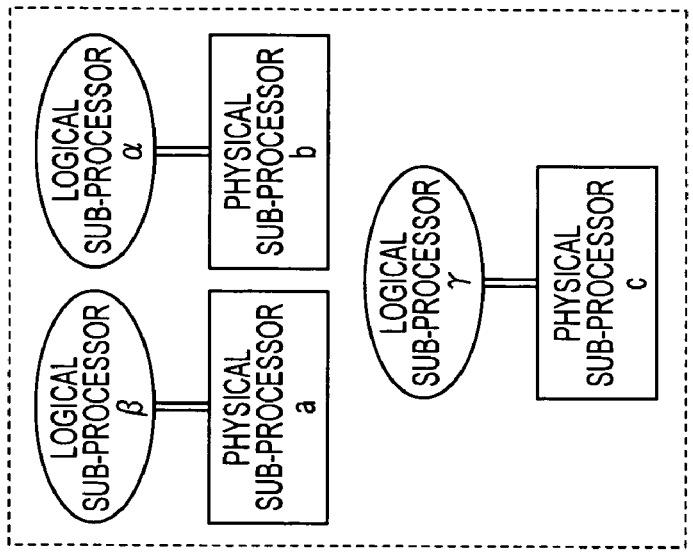
FIGS. 18A and 18B illustrate a switching process of switching a temperature-dependent allocation relationship between the logical processor and the physical processor.
Figure 18A:
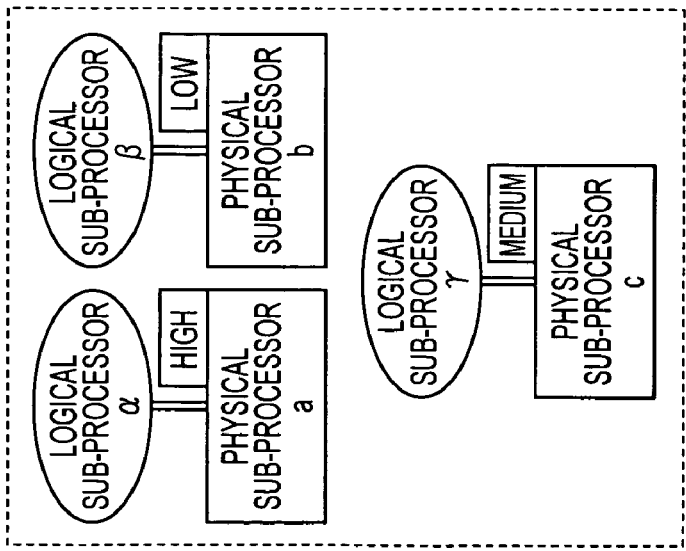

FIGS. 18A and 18B illustrate the concept of the temperature-dependent processor switching process switching the allocation relationship between the logical processor and the physical processor at the moment the temperature rise detected by each of the temperature sensors 271 through 273 and 281 through 283 (see FIG. 16) arranged close to the physical processors reaches the predetermined temperature threshold.

As shown in FIG. 18A, the allocation relationship between the logical processor and the physical processor is as follows:
  logical processor α=physical processor a;
  logical processor β=physical processor b; and
  logical processor γ=physical processor c.

If the physical processor a reaches and rises above a predetermined temperature threshold, the allocation relationship with the logical sub-processor a allocated to the physical sub-processor α and with the logical sub-processor b allocated to the physical sub-processor b is reversed as follows:
  logical processor β=physical processor a;
  logical processor α=physical processor b; and
  logical processor γ=physical processor c.

In this switching process, the logical sub-processor α that has presumably executed a process requiring a high throughput is switched from the physical processor a to the physical processor b in allocation. The process of the logical processor α is thus continuously performed by another single physical processor with excessive temperature rise controlled.

Instead of switching the allocation relationship in response to the temperature rise detection of the processor by the temperature sensor, the timer unit can be used to switch the allocation relationship between a physical processor having the highest temperature and a physical processor having the lowest temperature every constant period of time. By performing a processor switching process (migration process), an excessive temperature rise resulting from using a single processor for a long period of time is avoided.

As described above, the control OS sets and updates the entry in the two address conversion tables, namely, the first conversion table for converting the logical partition address space into the physical address space and the second conversion table for converting the virtual address space into the physical address space in order to modify the allocation relationship between the logical processor and the physical processor. Depending on situations, the logical to physical processor allocation relationship is set and updated. The physical processor thus processes data in a time sharing manner in accordance with the data process sequence. Appropriate data processing is performed taking into consideration the workload on hardware and data processing programs.

If viewed from the logical partition set corresponding to the guest OS, the process of the logical partition is continuously performed even if the physical processor is changed by updating the conversion table. The guest OS can process data in the same process environment as the one in which a single physical processor virtually performs the same process in a continuous fashion.

A physical processor that fails in the initial or subsequent stage of service life can be excluded from the logical to physical processor allocation relationship. This process is described below with reference to FIG. 19.

An apparatus having a plurality of physical processors can contain a faulty physical processor unable to process data. Such a physical processor may be originally faulty or subsequently become faulty in service life. The faulty physical processor is excluded from the allocation relationship.

Figure 19:
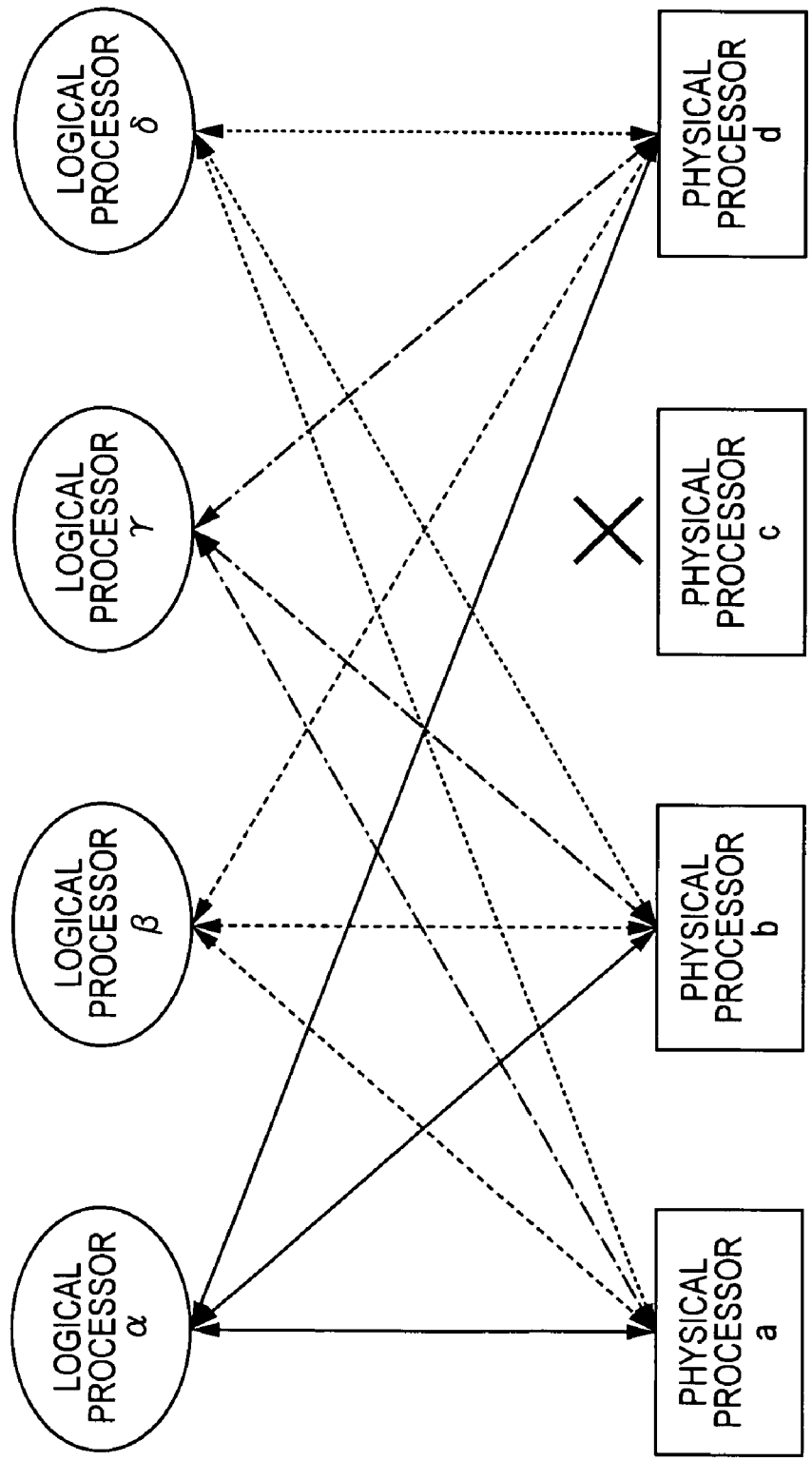
FIG. 19 illustrates a process of excluding a physical processor that becomes defective at a pre-operation stage or an operation stage from allocation candidates to the logical processor.

FIG. 19 illustrates four physical processors a through d. The logical processors are allocated to these physical processors. It is assumed that the physical processor c is originally faculty or subsequently becomes faulty in service life and is unable to perform a data processing function or suffers from low performance.

The logical processor α through δ are allocated to the physical processors a, b, and d. The physical processor c is excluded from the allocation relationship. As previously discussed, it is not a requirement that the logical processors and the physical processors be allocated to each other on one-to-one correspondence, and that the logical processors be equal in number to the physical processors.

The control OS performing the allocation process for allocating the logical processor to the physical processor excludes a faulty physical processor from the allocation relationship and produces the address conversion table determining the allocation relationship between the logical processor and the physical processor to allocate the logical processor to only normally operating physical processors. If an originally faulty physical processor is contained, the address conversion table excluding that physical processor from the allocation relationship is produced in the beginning. If any physical processor subsequently becomes faulty in service life, the address conversion table is updated to exclude the faulty physical processor from the allocation relationship.

Only the normal physical processors are used with the faulty physical processor excluded. The apparatus is thus free from an error in data processing. For example, in an apparatus including a chip with n physical processors mounted thereon, logical processors are allocated to only m physical processors (n>m). The apparatus thus functions as an apparatus having the m processors.

If it is predicted that a plurality of physical processors contain faulty ones at a predetermined ratio, a data processing program of an apparatus having the n physical processors is preferably developed as a program processing data with the m physical processors only (n>m). With this arrangement, even if physical processors of the number equal to the difference between n and m subsequently become faulty, data processing is performed without any problems.

Figure 20A:
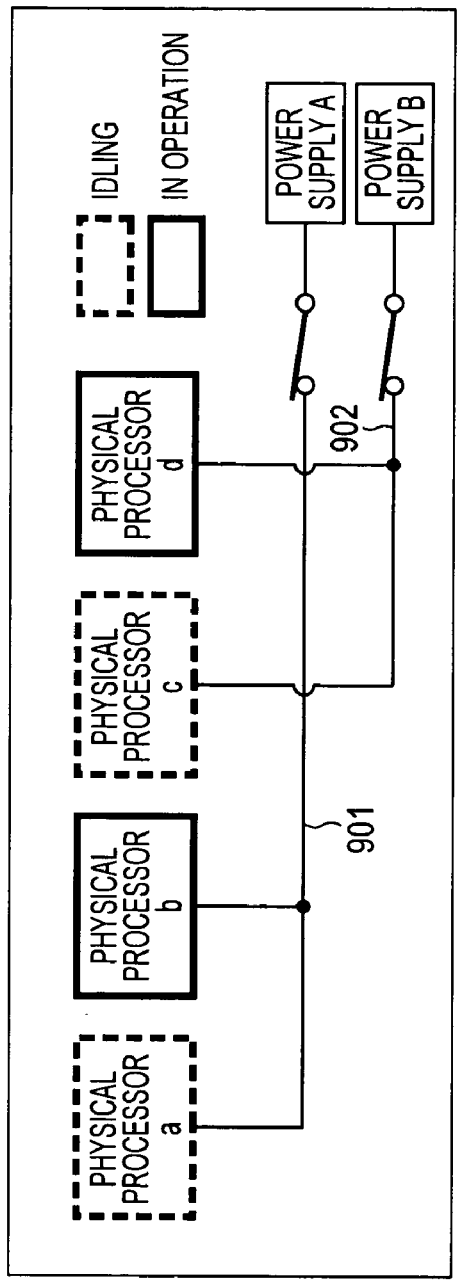
FIGS. 20A and 20B illustrate an arrangement that determines the allocation relationship between the logical processor and the physical processor based on the relationship between the physical processor and a power supply in use.
Figure 20B:
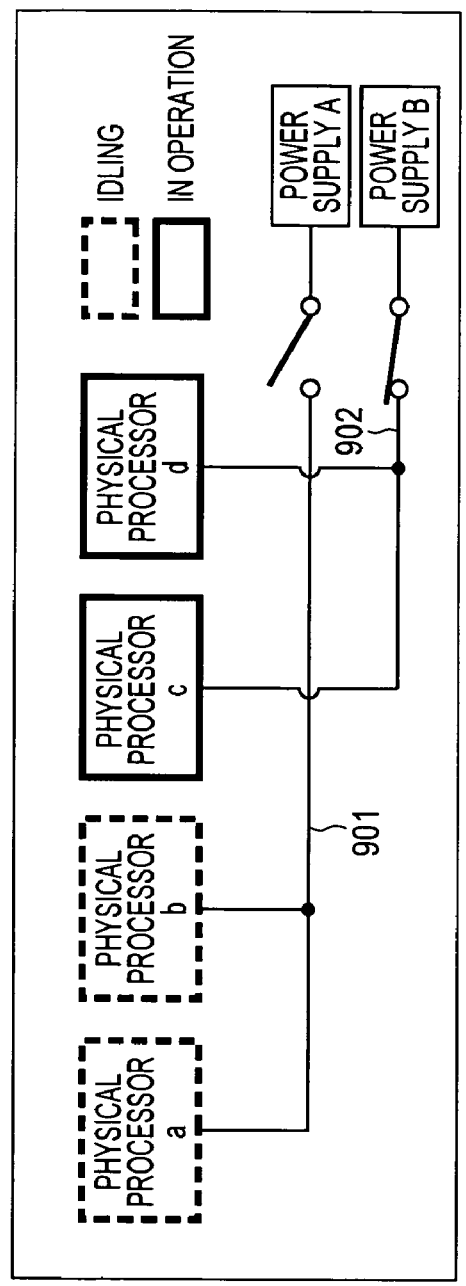

The logical to physical processor allocation relationship is set based on the relationship between the physical processor and power supply in use as shown in FIGS. 20A and 20B. In an apparatus having a plurality of physical processors, a physical processor group common to a power supply line from a power supply is used. As shown in FIG. 20A, a physical processor a and a physical processor b receive power from a power supply A via a single power supply line 901. A physical processor c and a physical processor d receive power from a power supply B via another power supply line 902.

If the physical processor b and the physical processor d process data during the same period of time with the physical processors a and c idling, the power supplies A and B supply power via the power supply lines 901 and 902.

The use of the two power supplies and the two power supply lines consumes more power than the use of one power supply and one power supply line. The number of power supplies and power supply lines is preferably minimized to save power if the number of physical processors concurrently operating is small.

The control OS performs the logical to physical processor allocation process based on the relationship based on the physical processors and the power supply in use, and sets and the updates the address conversion table. As shown in FIG. 20B, the apparatus includes the physical processors a and b connected to the single power supply via the power supply line 901 and the physical processor c and d connected to the single power supply via the power supply line 902. In this arrangement, the logical processors are allocated to only the two physical processors supplied with power via one power supply line.

As shown in FIG. 20B, logical processors are allocated to the physical processors c and d to process data. The physical processors a and b are in an idle state, namely, inactive state, and need no power. Power is thus supplied via only the power supply line 902. Power saving is thus performed.

The control OS performing the logical to physical processor allocation process references a relationship table between each physical processor and power supply, and sets and updates the address conversion table that determines the logical to physical processor allocation relationship so that the number of power supplies to switch on during process time and the number of power supply lines are minimized. Power saving is thus performed.

With reference to FIGS. 21 through 23A and 23B, a memory used by the physical processor with the logical processor allocated thereto in the data processing is described below. Also described is the setting of the logical to physical processor allocation relationship based on locations of the physical processors.

An information processing apparatus of FIG. 21 includes four physical processors a through d, and memories X and Y. In data processing, each of the physical processors a through d accesses the memories X and Y. The memories X and Y are separately located within the apparatus. Each processor stores data to and reads data from the memory X and the memory Y via an internal bus 911.

From the standpoint of a memory access process and a data transfer process via the bus, a short distance between the physical processor and the memory increases bus usage efficiency, and shortens access time and process time.

The control OS monitors memory access status of the physical processor with the logical processor allocated thereto to perform a variety of processes. Depending on the access status, the control OS allocates the logical processor to the physical processor arranged closer to the memory having a high frequency of access.

A monitoring unit 921 monitors the allocation relationship between the logical processor set for a variety of processes and the physical processor executing the process corresponding to the logical processor, and the memory access status of each physical processor. The monitoring unit 921 is shown as being in a single block. In a monitoring process, memory accesses counted by a hardware unit arranged in each individual physical processor are monitored by a monitoring program of the control OS. The monitoring process is described below with reference to FIGS. 22A and 22B.

Figures 22A, 22B:
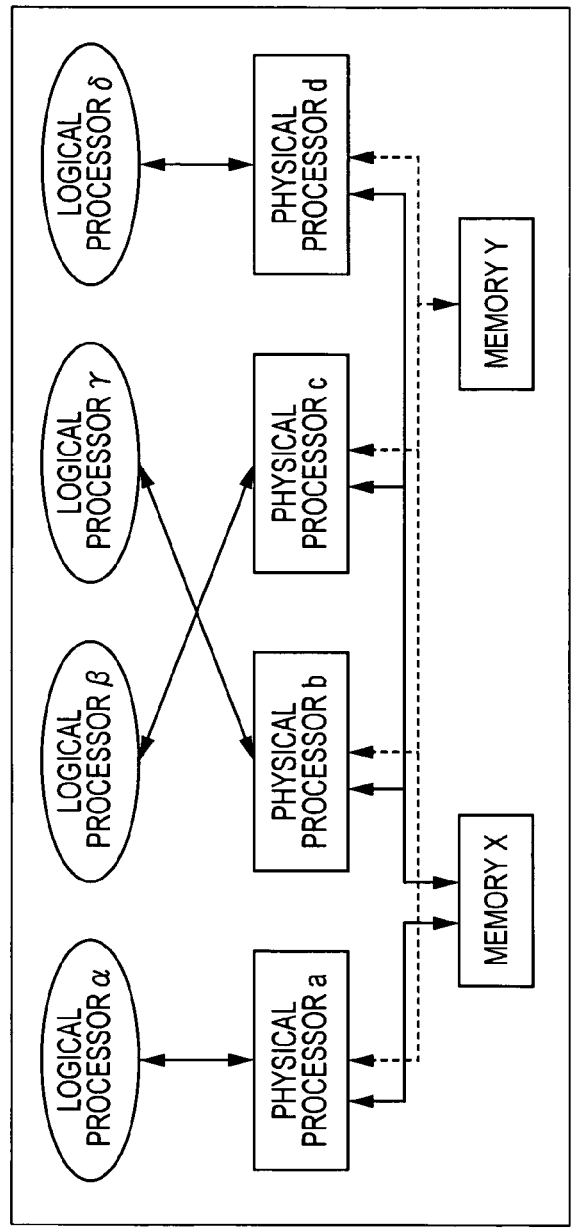
FIGS. 22A and 22B illustrate the allocation process of allocating the logical processor to the physical processor based on accessing to the physical processor.

FIG. 22B illustrates the logical to physical processor allocation process executed in a given data processing sequence, and the memory access of the physical processor. The physical processors a through d access the memories X and Y. The memory X and the memory Y are spaced apart from each other within the information processing apparatus. The memory X is located close to the physical processors a and b, and the memory Y is located close to the physical processors c and d.

FIG. 22A illustrates data acquired as a result of the monitoring process performed by the control OS with the data processing performed with the logical to physical processor allocation relationship of FIG. 22B. The monitored data contains the logical to physical processor allocation relationship and recorded data of the access frequency of each physical processor to the memory X and the memory Y.

The physical processor a executes the process corresponding to the logical processor α. The data shows that the physical processor a accesses the memory X by 20 times, and the memory Y by 7 times. Similarly, concerning other physical processors, allocated logical processors and access frequencies are listed. The period of the monitoring process is not limited to any time sequence. The monitoring process can be performed throughout the period of a particular process. Alternatively, the monitoring process may be performed at any pre-programmed time.

As discussed with reference to FIG. 22B, the physical processor a and the physical processor b are located to be closer to the memory X than to the memory Y. The physical processors c and d are located to be closer to the memory Y than to the memory X. To achieve high access efficiency, short access time, and short process time, each physical processor is preferably located to close to a memory having a higher access frequency.

The monitoring results of FIG. 22A show that the physical processor a with the logical processor α allocated thereto has an access count of "20" to the memory X, and an access count of "7" to the memory Y. The access count to the memory X closer to the physical processor a is thus higher than the access count to the memory Y. With the logical processor α allocated to the physical processor a, the process is efficiently executed.

The physical processor b with the logical processor γ allocated thereto has an access count of "2" to the memory X, and an access count of "25" to the memory Y. The access count to the memory X closer to the physical processor b is smaller than the access count to the far memory Y. Efficiency presumably drops in the process with the logical processor γ allocated to the physical processor b.

The physical processor c with the logical processor β allocated thereto has an access count of "5" to the memory X and an access count of "30" to the memory Y. The access count to the memory Y closer to the physical processor c is higher than the access count to the far memory X. Efficient process is thus performed with the logical processor β allocated to the physical processor c.

The physical processor d with the logical processor δ allocated thereto has an access count of "12" to the memory X and an access count of "5" to the memory Y. The access count to the memory Y closer to the physical processor d is smaller than the access count to the far memory X. Efficiency in the process presumably drops with the logical processor δ allocated to the physical processor d.

Based on the monitoring results, the control OS updates the logical to physical processor allocation relationship to execute the same process next time. Depending on the access status, the logical processor corresponding to the process is allocated to a physical processor closer to the memory having a higher access count. As previously discussed, the control OS sets any logical to physical processor allocation relationship by updating the address conversion table. Based on the monitoring results, the address conversion table is updated so that the logical processor is allocated to the physical processor close to the memory having a higher access count.

From the monitoring results of FIG. 22A, the allocation relationship of the logical processor α to the physical processor a and the logical processor β to the physical processor c excellently works. But the allocation relationship of the logical processor γ to the physical processor b and the logical processor δ to the physical processor d results in a drop in data transfer efficiency. By updating the address conversion table, the control OS updates the logical to physical processor allocation relationship so that the logical processor corresponding to the process is allocated to the physical processor closer to the memory having a higher access count.

The logical to physical processor allocation relationship subsequent to the update process and the memory access frequency are described below with reference to FIG. 23. The control OS updates the logical to physical processor allocation relationship by updating the address conversion table. More specifically, the address conversion table is updated so that the logical processor corresponding to the process is allocated to the physical processor located closer to the memory having a higher access count.

Figures 23A, 23B:
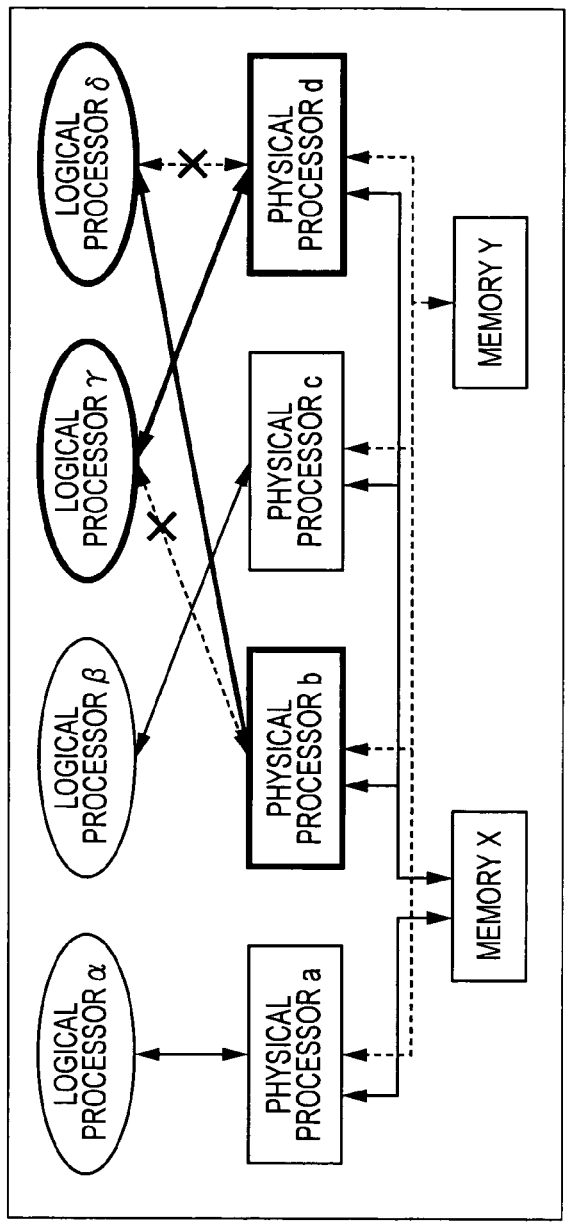
FIGS. 23A and 23B illustrate the allocation process of allocating the logical processor to the physical processor based on accessing to the physical processor.

As shown in FIG. 23A, the logical to physical processor allocation relationship is determined as follows:
logical processor α: physical processor a;
logical processor δ: physical processor b;
logical processor β: physical processor c; and
logical processor γ: physical processor d.

If the same process as that process discussed with reference to FIGS. 22A and 22B is performed with that allocation relationship, the memory access monitoring results of the physical processor is shown in FIG. 23B.

Each of the physical processor a with the logical processor α allocated thereto and the physical processor b with the logical processor δ allocated thereto has an access count to the near memory X larger than an access count to the far memory Y, and thus achieves a high process efficiency.

Similarly, each of the physical processor c with the logical processor β allocated thereto and the physical processor d with the logical processor γ allocated thereto has an access count to the near memory Y larger than an access count to the far memory X, and achieves a high process efficiency.

The control OS performing the logical to physical processor allocation process updates the address conversion table depending on the memory access status of each physical processor with the logical processor allocated thereto. The control OS thus update the logical to physical processor allocation relationship. The address conversion table is updated so that the logical processor is allocated to the physical processor located closer to the memory having a higher access frequency. Data accessing is sped up, and data processing is thus performed at a high efficiency.

The above-references series of steps can be performed by software, hardware, or a combination thereof. If the series of steps is performed by software, a program forming the software is installed from a recording medium or via a network onto a computer incorporated into a hardware structure or to a general-purpose computer, for example.

The program can be recorded beforehand onto one of a hard disk and a read-only memory (ROM) as a recording medium. The program can also be recorded on a removable recording media temporarily or permanently. The recording media includes a floppy disk, a compact disk read-only memory (CD-ROM), a magneto-optic (MO) disk, a digital versatile disk (DVD), a magnetic disk, a semiconductor memory, etc. Such a removable medium can be supplied in package software.

The program can be installed from the removable recording medium to the computer. The program can be transmitted in a wireless fashion to the computer from a download site. The program can also be transmitted in a wired fashion via a network such as one of a local area network (LAN) and the Internet. The program is then received by the computer and installed onto a recording medium such as a hard disk in the computer.

The process steps discussed in this specification are sequentially performed in the time series order as stated. Alternatively, the steps may be performed in parallel or separately. In this specification, the system refers to a logical system composed of a plurality of apparatuses, and the elements of each apparatus are not necessarily contained in the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for controlling an allocation relationship between a physical processor having a physical address and a logical processor comprising:
    a control operating system executing a process for allocating a plurality of logical processors to a physical processor in a time division manner; and
    a guest operating system for which a logical partition, having a logical partition address and one or more virtual address spaces, is set as an application entity of the logical processor,
    wherein the control operating system sets and updates, in computer memory, the allocation relationship between the logical processor and the physical processor, by setting and updating two address conversion tables, a first conversion table with record comprising an index for the logical partition address and the physical address of the physical processor and a second conversion table with record comprising an index for one of the one or more virtual address spaces in the guest operating system and the physical address of the physical processor, so that that a physical address acquired from an index of the first conversion table corresponding to the logical processor and a physical address acquired from an index of the second conversion table corresponding to the logical processor are the same address corresponding to the same physical processor.

2. The information processing apparatus according to claim 1, wherein in order to switch the allocation relationship between the logical processor and the physical processor, the control operating system acquires a physical address determined from an index of the first conversion table corresponding to the logical processor allocated to the physical processor, invalidates all entries in the second conversion table holding the acquired physical address, acquires an index of the first conversion table corresponding to a logical processor that is newly allocated to the physical processor, and stores, as a physical address corresponding to the acquired index, physical address information of the physical processor with the logical processor to be allocated thereto.

3. The information processing apparatus according to claim 2, wherein the physical address comprises a physical address of a memory mapped input and output register of the physical processor.

4. The information processing apparatus according to claim 1, wherein the control operating system updates the allocation relationship between the logical processor and the physical processor to switch from one physical processor to another at the moment an operation time of a process of using the one physical processor reaches a predetermined threshold time.

5. The information processing apparatus according to claim 1, wherein the control operating system updates the allocation relationship between the logical processor and the physical processor to switch from one physical processor to another at the moment the temperature of the one physical processor reaches a predetermined threshold temperature.

6. The information processing apparatus according to claim 1, wherein the control operating system sets the allocation relationship between the logical processor and the physical processor so that a plurality of physical processors operating in parallel are set as a physical processor group connected to the same power supply line.

7. The information processing apparatus according to claim 1, wherein the control operating system sets the allocation relationship between the logical processor and the physical processor, based on access status of the physical processor accessing to memories arranged in different locations within the information processing apparatus, in a manner such that an access frequency of a physical processor accessing to a memory located closer to the physical processor becomes higher.

8. A computer-implemented process control method for processing data with a plurality of logical processors allocated to a physical processor having a physical address in a time division manner, the method comprising:
    performing, by a processor, the operations of:
        setting a logical partition on a guest operating system as an application entity of the logical processor, the logical partition having a logical partition address and one or more virtual address spaces; and
        updating two address conversion tables, a first conversion table with record comprising an index for the logical partition address and the physical address of the physical processor and a second conversion table with record comprising an index for one of the one or more virtual address spaces in the guest operating system to the physical address of the physical processor, so that that a physical address acquired from an index of the first conversion table corresponding to the logical processor and a physical address acquired from an index of the second conversion table corresponding to the logical processor are the same address corresponding to the same physical processor.

9. The process control method according to claim 8, wherein in order to switch the allocation relationship between the logical processor and the physical processor, the performing further comprises the operations of:
    updating a physical address determined from an index of the first conversion table corresponding to the logical processor allocated to the physical processor,
    invalidating all entries in the second conversion table holding the acquired physical address, acquiring an index of the first conversion table corresponding to a logical processor that is newly allocated to the physical processor, and storing, as a physical address corresponding to the acquired index, physical address information of the physical processor with the logical processor to be allocated thereto.

10. The process control method according to claim 9, wherein the physical address comprises a physical address of a memory mapped input and output register of the physical processor.

11. The process control method according to claim 8, the performing further comprising the operation of updating the allocation relationship between the logical processor and the physical processor to switch from one physical processor to another at the moment an operation time of a process of using the one physical processor reaches a predetermined threshold time.

12. The process control method according to claim 8, the performing further comprising the operation of updating the allocation relationship between the logical processor and the physical processor to switch from one physical processor to another at the moment the temperature of the one physical processor reaches a predetermined threshold temperature.

13. The process control method according to claim 8, the performing further comprising the operation of setting the allocation relationship between the logical processor and the physical processor so that a plurality of physical processors operating in parallel are set as a physical processor group connected to the same power supply line.

14. The process control method according to claim 8, the performing further comprising the operation of setting the allocation relationship between the logical processor and the physical processor, based on access status of the physical processor accessing to memories arranged in different locations within the information processing apparatus, in a manner such that an access frequency of a physical processor accessing to a memory located closer to the physical processor becomes higher.

15. A computer program product, comprising a non-transitory computer usable medium having a computer readable program code embodied therein, the computer readable program code adapted for processing data with a plurality of logical processors allocated to a physical processor having a physical address in a time division manner comprising steps of:

setting a logical partition on a guest operating system as an application entity of the logical processor, the logical partition having a logical partition address and one or more virtual address spaces; and updating two address conversion tables, a first conversion table with record comprising an index for the logical partition address and the physical address of the physical processor and a second conversion table with record comprising an index for one of the one or more virtual address spaces in the guest operating system and the physical address of the physical processor, so that that a physical address acquired from an index of the first conversion table corresponding to the logical processor and a physical address acquired from an index of the second conversion table corresponding to the logical processor are the same address corresponding to the same physical processor.

16. The computer program product according to claim 15, wherein in order to switch the allocation relationship between the logical processor and the physical processor, the steps further comprising:

updating a physical address determined from an index of the first conversion table corresponding to the logical processor allocated to the physical processor, invalidating all entries in the second conversion table holding the acquired physical address, acquiring an index of the first conversion table corresponding to a logical processor that is newly allocated to the physical processor, and storing, as a physical address corresponding to the acquired index, physical address information of the physical processor with the logical processor to be allocated thereto.

17. The computer program product according to claim 16, wherein the physical address comprises a physical address of a memory mapped input and output register of the physical processor.

* * * * *